(12) United States Patent
Hayakawa et al.

(10) Patent No.: US 8,521,957 B2
(45) Date of Patent: Aug. 27, 2013

(54) CACHE CONTROL METHOD FOR A COMPUTER SYSTEM

(75) Inventors: Hitoshi Hayakawa, Yokohama (JP); Daisuke Ito, Kamakura (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 13/179,646

(22) Filed: Jul. 11, 2011

(65) Prior Publication Data

US 2012/0030427 A1 Feb. 2, 2012

(30) Foreign Application Priority Data

Aug. 2, 2010 (JP) ................................. 2010-173419

(51) Int. Cl.
*G06F 13/00* (2006.01)

(52) U.S. Cl.
USPC .................................. 711/118; 711/E12.025

(58) Field of Classification Search
None
See application file for complete search history.

(56) References Cited

U.S. PATENT DOCUMENTS

| | | | |
|---|---|---|---|
| 2003/0217238 A1* | 11/2003 | Rowlands et al. | 711/154 |
| 2005/0216692 A1* | 9/2005 | Watanabe et al. | 711/170 |
| 2006/0265554 A1* | 11/2006 | Carter et al. | 711/144 |
| 2007/0162462 A1 | 7/2007 | Zhang et al. | |

OTHER PUBLICATIONS

Daisuke Ito et al., U.S. Appl. No. 12/947,248, filed Nov. 16, 2010.
Jian Liang et al., "The Design of a Wide-Area Networked File System", pp. 1-25, NEC Laboratories, Princeton, NJ, 08540.
Jian Liang et al., "Minimizing Metadata Access Latency in Wide Area Networked File Systems", pp. 1-20, NEC Laboratories, Princeton, NJ, 08540.

* cited by examiner

*Primary Examiner* — Edward Dudek, Jr.
*Assistant Examiner* — Sean D Rossiter
(74) *Attorney, Agent, or Firm* — Crowell & Moring LLP

(57) ABSTRACT

Disclosed is a computer system that includes a first apparatus, which stores data and metadata in a storage, and multiple units of a second apparatus, which store a copy of data and metadata in the first apparatus in a cache. The first apparatus acquires throughput achieved when the units of the second apparatus access the data in the storage as first access information, acquires throughput achieved when the units of the second apparatus access data thereof as second access information, and selects either a first judgment mode or a second judgment mode in accordance with the first access information and the second access information. This reduces the amount of network traffic for metadata acquisition, thereby increasing the speed of data access.

9 Claims, 19 Drawing Sheets

FIG. 2
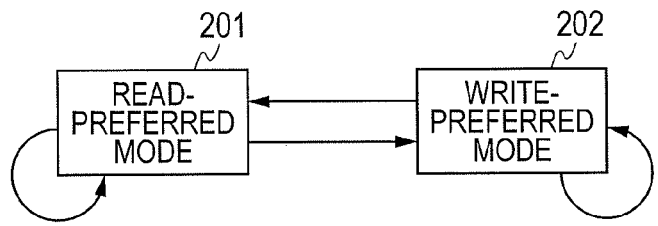
FIG. 3
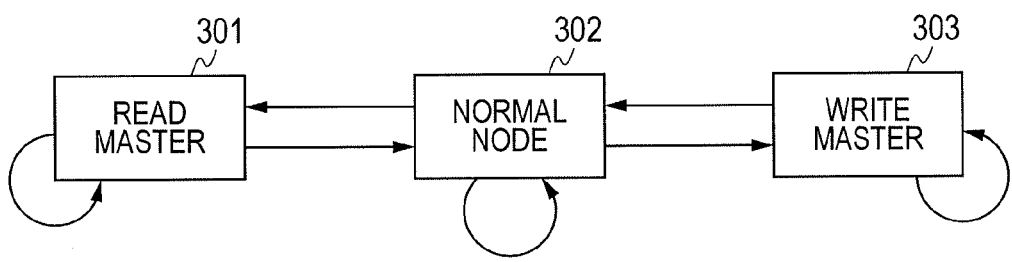
FIG. 4
| ACCESS MODE | NODE STATE | |
|---|---|---|
| 201 — READ PREFERRED | READ MASTER | ~301 |
| | NORMAL NODE | ~302 |
| 202 — WRITE PREFERRED | WRITE MASTER | ~303 |
| | NORMAL NODE | ~302 |

MASTER MANAGEMENT TABLE

| FILE PATH | ACCESS MODE | MASTER |
|---|---|---|
| /data/manual.doc | READ PREFERRED | NODE 1 |
| /data/user.txt | WRITE PREFERRED | NODE 1 |
| /data/share.dat | WRITE PREFERRED | NODE 2 |

USING INFORMATION MANAGEMENT TABLE

| FILE PATH | TYPE | ID | USER NAME | ACCESS TO | TRANSFER SIZE | TRANSFER TIME | ACQUIRED METADATA | ACQUISITION TIME |
|---|---|---|---|---|---|---|---|---|
| /data/manual.doc | READ | 1234 | USER A | CACHE | 0 | 0 | METADATA 1 | 10:21:12 |
| /data/user.txt | WRITE | 2345 | USER B | NODE 1 | 1024000 | 0.12 | METADATA 2 | 10:22:23 |
| /data/share.dat | READ | 3456 | USER A | MANAGER | 307200 | 0.05 | METADATA 3 | 10:20:52 |

119
ACCESS MANAGEMENT TABLE

| NODE NAME | ACCESS DESTINATION | TIME | TRANSFER SIZE | TRANSFER TIME | TRANSFER DIRECTION | ROUND-TRIP TIME (RTT) |
|---|---|---|---|---|---|---|
| NODE 1 | NODE 2 | 10:21:43 | 10240000 | 0.2 | READ | 0.001 |
| NODE 1 | MANAGER | 10:21:25 | 3584000 | 8.4 | READ | 0.1 |
| NODE 2 | NODE 3 | 10:22:10 | 1024000 | 0.5 | WRITE | 0.02 |

FIG. 8

118
USING FILE MANAGEMENT TABLE

| FILE PATH | TYPE | ID | USER NAME | NODE |
|---|---|---|---|---|
| /data/manual.doc | READ | 4321 | USER A | NODE 1 |
| /data/user.txt | WRITE | 6543 | USER B | NODE 2 |
| /data/share.dat | READ | 7654 | USER A | NODE 3 |

CACHE CONTROL METHOD FOR A COMPUTER SYSTEM

CLAIM OF PRIORITY

The present application claims priority from Japanese patent application JP 2010-173419 filed on Aug. 2, 2010, the content of which is hereby incorporated by reference into this application.

FIELD OF THE INVENTION

The present invention relates to a computer network field, and more particularly to a cache control technology.

BACKGROUND OF THE INVENTION

In recent years, servers are consolidated at a data center or a center site and vigorously used by multiple sites through a wide area network for the purpose of server management and operation efficiency enhancement. A typical example is data aggregation. Data aggregation is a process in which server data at a center site is used by clients at various sites. In data aggregation, the clients at various sites access server data through a wide area network. Data access through such a wide area network requires longer data access time than data access through an intra-site local area network (LAN) due to increased delay time and decreased effective bandwidth. An increase in data access time poses a problem because it may decrease the efficiency of a data handling process.

A data access pattern in data aggregation varies with target data and access timing. For example, the apparatus management record of a particular site may be frequently read or written from the site. Meanwhile, the map of a site is not frequently written but is read by many sites.

When data is to be accessed, metadata is required in addition to the data to be accessed by a client. The metadata is the information about the data, such as the name and type of the data. More specifically, the metadata includes, for instance, the summary of real data (checksum), write time, and access authority. The data to be accessed by a client is referred to as the real data in order to differentiate it from the metadata.

A cache technology is used as a technology for increasing the speed at which server data is accessed through a wide area network. The cache technology stores a copy of real data in a cache near a client and uses the cached real data to suppress a wide area network communication during data access. An agent that stores real data in a cache at a site is hereinafter referred to as a node. When the node is about to use real data stored in a cache through the use of the cache technology, it is necessary, from the viewpoint, for instance, of recency and access right, to perform an availability judgment process to determine whether the real data is available. This process uses the metadata.

When the cache technology is used, the metadata is generally managed by a server. One reason is that the metadata is smaller in size and transferred in shorter time than the real data. Another reason is that when the metadata is stored in multiple nodes, it is necessary to exercise complex control and determine whether the metadata stored in the server is up to date. However, when the metadata is managed by the server, each node has to access the metadata in the server through a wide area network in order to perform the availability judgment process. When the metadata is accessed, the effective bandwidth are not significantly decreased by the use of the wide area network because the metadata is small in size. However, accessing the metadata takes tens of milliseconds to several seconds due to an increase in delay time. As accessing the cached real data takes only several milliseconds to tens of milliseconds, it is preferred that the availability judgment process be completed without accessing the server.

A related technology disclosed, for instance, in US Patent Publication No. 2007/0162462 allows a node accessing particular data to manage metadata in accordance with access frequency. The related technology handles a collection of data as a file and uses a cache to increase the speed of file access. The related technology regards a node that frequently accesses a certain file as a home, and allows the home to cache real data and metadata of the file and manage the metadata. Nodes other than the home cache real data and make an inquiry to the home about the metadata when a file is to be opened to read. The home makes a response by using the managed metadata and manages, in accordance with the inquiry, the fact that another node uses the cache until the file reading is closed. At first, only the home has the authority to write data. This authority is referred to as the owner authority. When the data is to be written, the home notifies a node using the cache that the cache becomes invalid. When a node other than the home performs a write, the owner authority is temporarily transferred to the node that performs the write. The node to which the owner authority is transferred performs the write within a time limit, notifies the home of the write, and returns the owner authority to the home. The related technology allows a node that frequently accesses a file to store the real data and manage the metadata, and increases the file access speed by performing the availability judgment process without communicating through the wide area network when the node accesses the file.

SUMMARY OF THE INVENTION

When the home frequently accesses a certain file, the related technology described above allows the home to read the file without communicating with another node, thereby increasing the file access speed. However, when a node other than the home reads the file, the node accesses the metadata in the home. It means that the node needs to communicate with the home through the wide area network. Consequently, if multiple nodes attempt to read the same data, nodes other than the home cannot access the data at a high speed as compared to the case where the metadata is managed by the server.

More specifically, when multiple nodes attempt to read the same data, it is necessary to establish communication through the wide area network in order to access the metadata. Therefore, the increase in the access speed is limited. This data access pattern frequently occurs when, for instance, multiple nodes located in various sites attempt to read the map of a site in which a particular node is located.

The present invention has been made in view of the above circumstances to increase the speed of data access by reducing the amount of network traffic for metadata acquisition.

According to one aspect of the present invention, there is provided a cache control method for use in a computer system including a first apparatus which has a processor and a storage and stores data and metadata giving information about the data in the storage, a second apparatus which has a processor and a cache and stores a copy of data and metadata in the first apparatus in the cache, and a network which connects the first apparatus to multiple units of the second apparatus. The cache control method includes a first step of causing the second apparatus to copy data and metadata in the first apparatus to the cache; a second step of causing the first apparatus to acquire transfer time, transfer size, and access delay time involved when the second apparatus accesses data in the storage, as first access information; a third step of causing the first apparatus to acquire transfer time, transfer size, and access delay time involved when the units of the second apparatus access the cached data, as second access information; and a fourth step of causing the first apparatus to select either a first judgment mode or a second judgment mode in accordance with the first access information and the second access information about individual data, the first judgment mode allowing the second apparatus to acquire the metadata in the first apparatus, store the acquired metadata in the cache, and judge in accordance with the stored metadata whether the data copied to the cache is available, the second judgment mode allowing the second apparatus to acquire the metadata in the first apparatus and judge in accordance with the acquired metadata whether the data copied to the cache is available. The fourth step includes the steps of: computing first access time, which is required for allowing the second apparatus to access data in the first apparatus in the first judgment mode, from the acquired first access information; computing second access time, which is required for allowing the second apparatus to access data in the units of the second apparatus in the second judgment mode, from the acquired second access information; and comparing the first access time and the second access time on individual data basis and selecting the first judgment mode for the data when the first access time is shorter than the second access time or selecting the second judgment mode for the data when the second access time is shorter than the first access time.

The present invention makes it possible to increase the speed of data access and use a network with high efficiency because the amount of network traffic for acquiring metadata necessary for determining whether a copy of data stored in each node apparatus is available is reduced when the individual units of the second apparatus (node apparatuses) access the data in the first apparatus (manager apparatus) in accordance with the access patterns of individual data.

BRIEF DESCRIPTION OF THE DRAWINGS

Embodiments of the present invention will be described in detail based on the following figures, in which:

FIG. 2 is a diagram illustrating system state transitions in the first embodiment of the present invention;

FIG. 3 is a diagram illustrating node apparatus state transitions in the first embodiment of the present invention;

FIG. 4 is a diagram illustrating the relationship between node apparatus states and computer system modes relative to files in the first embodiment of the present invention;

FIG. 5 is a diagram illustrating an example of a master management table that is used by a manager apparatus or node apparatuses according to the first embodiment of the present invention;

FIG. 6 is a diagram illustrating an example of a using information management table that is used by the node apparatuses according to the first embodiment of the present invention;

FIG. 7 is a diagram illustrating an example of an access management table that is used by the manager apparatus according to the first embodiment of the present invention;

FIG. 8 is a diagram illustrating an example of a using file management table that is used by the manager apparatus according to the first embodiment of the present invention;

DETAILED DESCRIPTION OF THE PREFERRED EMBODIMENTS

Embodiments of the present invention will now be described with reference to the accompanying drawings.

First Embodiment

System Configuration

First of all, the configuration of a computer system will be described below.

Figure 1:
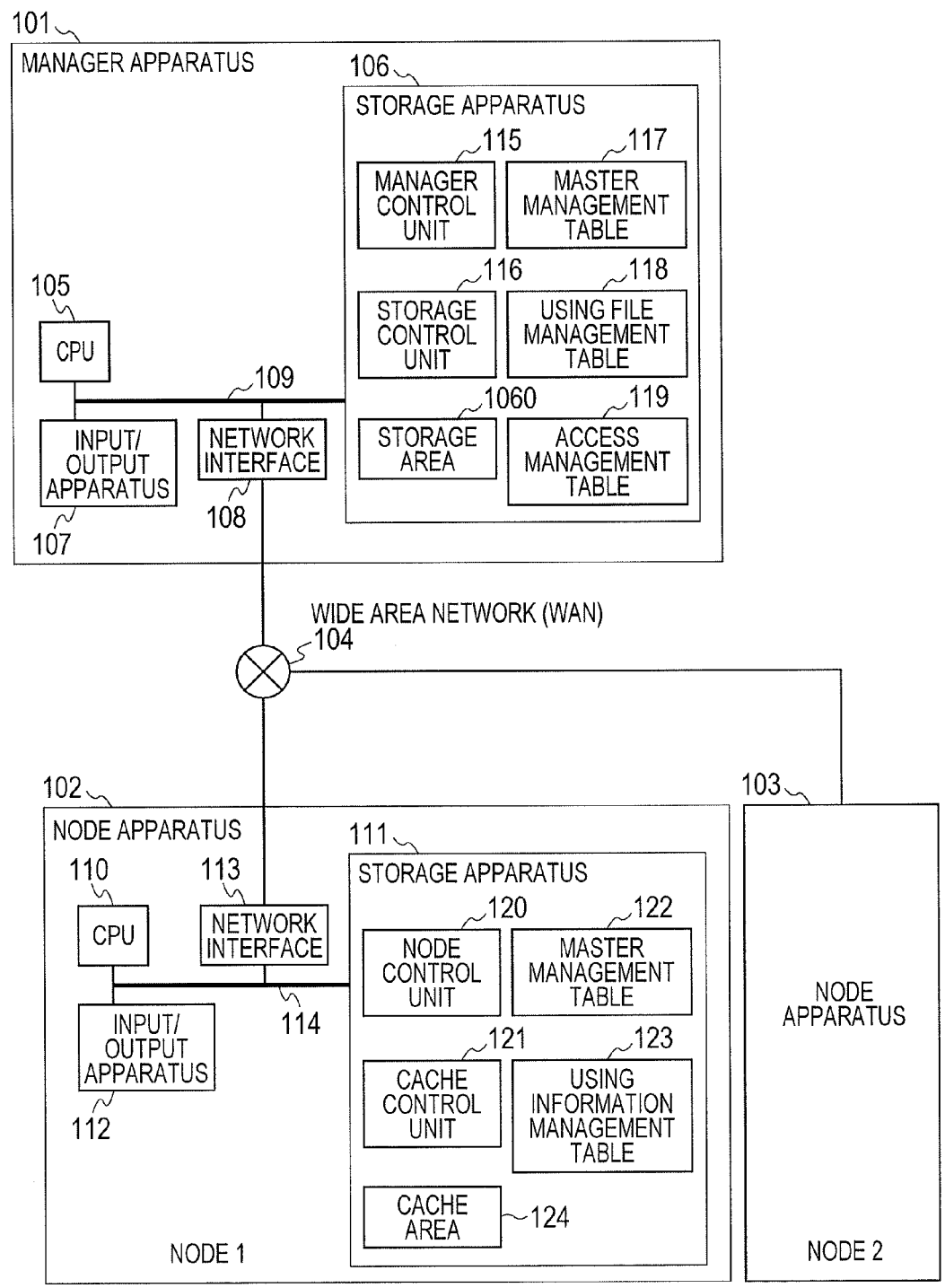
FIG. 1 is a block diagram illustrating an example configuration of a computer system according to a first embodiment of the present invention.

FIG. 1 is a block diagram illustrating an example configuration of the computer system according to a first embodiment of the present invention.

The computer system according to the first embodiment includes three computers, namely, a manager apparatus 101, a node apparatus 102, and a node apparatus 103. These three computers are interconnected through a wide area network (WAN) 104. The computer system according to the present embodiment is designed to let the node apparatuses 102, 103 rapidly access data stored in the manager apparatus 101. In the present embodiment, program execution takes place in each of the three computers, namely, the manger apparatus 101, the node apparatus 102, and the node apparatus 103. The hardware configurations of the computers are described below.

The manager apparatus 101 communicates with the node apparatuses 102, 103 through the WAN 104. The manager apparatus 101 includes a CPU 105, a storage apparatus 106, an input/output apparatus 107, and a network interface 108. These components are interconnected through a common bus 109. The CPU 105 is a central processing unit that implements the functionality of the manager apparatus 101 by executing a program loaded into the storage apparatus 106. The storage apparatus 106 stores a program to be executed by the CPU 105, data used by the program, and data generated upon execution of the program. The storage apparatus 106 may be, for example, a nonvolatile semiconductor memory such as a DRAM (dynamic random access memory and a flash memory, a data storage apparatus such as a hard disk and an optical disk (including a apparatus that is installed outside the manager apparatus 101 to communicate with the manager apparatus 101 through the network interface 108 or the input/output apparatus 107), or a combination of these.

In the present embodiment, a manager control unit 115 and a storage control unit 116, which are programs, are loaded into the storage apparatus 106 and executed by the CPU 105. The storage apparatus 106 stores a master management table 117, a using file management table 118, and an access management table 119. Data contained in these tables is information created by the manager control unit 115 and will be described in detail later. An operation of the manager control unit 115 will also be described later.

The storage control unit 116 is a program that stores data used by the manager control unit 115 in a predetermined area (storage area 1060) within the storage apparatus 106. The storage control unit 116 may be, for example, a file system, a database system, or a key-value store. The storage area 1060, which is a predetermined area within the storage apparatus 106, includes a nonvolatile storage area of a nonvolatile semiconductor memory or hard disk and a volatile storage area formed, for instance, by a DRAM. The storage control unit 116 performs a process, for instance, of loading data requested by the manager control unit 115 into the volatile storage area from the nonvolatile storage area or writing volatile storage area data into the nonvolatile storage area.

The storage control unit 116 also stores metadata, which is the information for managing the data to be stored in the storage area 1060 of the storage apparatus 106. The metadata may be attribute information about data, such as the name, the directory and other hierarchical information, the access authority, the owner information, the time of data manipulation, the summary of data, the location of related data, the physical or logical storage location, the data format, the relationship to other data, the expiration date, the author information, and the data handling rules. It is assumed that the data is real data. In the present embodiment, the data is handled in the form of a file. The file contains real data, and the metadata is used as the information representing, for instance, the attributes of the file.

The storage control unit 116 may be integrated, for instance, into the manager control unit 115 or implemented by an apparatus separate from the manager control unit 115 to adjust, for instance, its data access performance and manufacturing cost. The storage apparatus 106 may store other data created by the manager control unit 115.

The input/output apparatus 107 performs information input/output operations relative to the manager apparatus 101. The input/output apparatus 107 may be, for example, a switch, a keyboard, a mouse, a microphone, a video camera, a printer, a display, or a speaker. The input/output apparatus 107 incorporates a communication function such as a serial communication function that establishes communication, for instance, through a signal cable or a radio wave or infrared wireless communication link. The input/output apparatus 107 enables the manager apparatus 101 to receive instructions from a user or an administrator and output results.

The network interface 108 is an apparatus, such as an Ethernet (registered trademark) card, that communicates with another computer through the WAN 104. Communication between the computers is established through the network interface 108 in accordance with instructions from the CPU 105.

However, there are no problems as far as the communication with the other apparatuses is established. Therefore, for example, a serial communication method may be used instead of an Ethernet method. Using a communication method other than the Ethernet method makes it possible to reduce power consumption, increase communication speed, or provide enhanced information transmission safety.

The common bus 109 is used to establish communication between the components of the manager apparatus 101. However, the present invention is not limited to the use of such a common bus. Any other method may be used to establish necessary communication between the components. When, for instance, the components are directly interconnected, it is possible to optimize the connections between the components, reduce the power consumption required for processing, and provide increased processing efficiency.

The node apparatus 102 communicates with the manager apparatus 101 and the node apparatus 103 through the WAN 104. The node apparatus 102 includes a CPU 110, a storage apparatus 111, an input/output apparatus 112, a network interface 113, and a common bus 114. The node apparatus 102 has the same configuration as the manager apparatus 101, which includes the CPU 105, the storage apparatus 106, the input/output apparatus 107, the network interface 108, and the common bus 109. The components named the same as those of the manager apparatus 101 will not be redundantly described. Data stored in the storage apparatus 111 included in the node apparatus 102 are described below.

In the present embodiment, a node control unit 120 and a cache control unit 121, which are programs, are loaded into the storage apparatus 111 and executed by the CPU 110. The storage apparatus 111 includes a nonvolatile storage area of a nonvolatile semiconductor memory or hard disk and a volatile storage area formed, for instance, by a DRAM. The CPU 110 loads a program into the volatile storage area from the nonvolatile storage area and then executes the loaded program. The cache control unit 121 sets a cache area 124 in the volatile storage area. The cache area 124 is used to temporarily store frequently used data.

The storage apparatus 111 stores a master management table 122 and a using information management table 123. Data contained in these tables is the information created by the node control unit 120 and will be described in detail later. An operation of the node control unit 120 will also be described later. The cache control unit 121 is a program that stores data used by the node control unit 120 in the cache area 124. It can store and read out any data. The cache control unit 121 may be, for example, a file system, a database system, or a key-value store. The cache control unit 121 may be integrated, for instance, into the node control unit 120 or implemented by an apparatus separate from the node control unit 120 to adjust, for instance, its data access performance and manufacturing cost. The storage apparatus 111 may store other data created by the node control unit 120.

The node apparatus 103 communicates with the manager apparatus 101 and the node apparatus 102 through the WAN 104. The node apparatus 103 has the same configuration as the node apparatus 102.

The WAN 104 is a narrow-band, high-delay wide area network. In the present embodiment, it is assumed that the WAN 104 is employed to enhance advantages of the present invention. However, the present invention is not limited to the use of such a WAN. A bus connection, a wireless communication link, or any other means of communication may be used as far as it permits the manager apparatus 101, the node apparatus 102, and the node apparatus 103 to communicate with each other. The use of such an alternative means of communication makes it possible, for instance, to improve access performance, increase the degree of freedom of arrangement, and provide enhanced processing efficiency in terms of cost and energy.

In the present embodiment, it is assumed that the computer system includes three computers. However, the present invention is not limited to the use of three computers. As the functions of the individual computers are implemented by programs executed by the computers, the present invention is applicable to a case where one or more computers are used. If, for instance, the computer system includes only the manager apparatus 101, a program having the functions of the manager apparatus 101, the node apparatus 102, and the node apparatus 103 may be executed by the manager apparatus 101 to provide increased ease of management. Meanwhile, the number of node apparatuses may be increased to permit the use of the computer system at an increased number of sites or provide load distribution.

Even when the present embodiment is described to have one program or one piece of data (e.g., management table), the present invention is not limited to the use of one program or one piece of data. More specifically, multiple programs or multiple pieces of data may be distributively executed or stored in a single computer or in multiple computers to perform a coordinated operation so that one program or one piece of data is used in a logical sense. When this configuration is employed, the load on the computer system can be distributed.

In the present embodiment, it is assumed that the manager apparatus 101, the node apparatus 102, and the node apparatus 103 each include a single CPU. Alternatively, however, each of these apparatuses may include multiple CPUs physically or logically. The reason is that although the functionality of each computer is implemented when a program is executed by a CPU, it is not dependent on the number of CPUs used for program execution. Similarly, the number of network interfaces, the number of input/output apparatuses, and the number of storage apparatuses are not limited to one. The manager apparatus 101, the node apparatus 102, and the node apparatus 103 may each include two or more of them.

Some or all of the functions implemented by programs stored in the storage apparatuses 106, 111 in the present embodiment may be implemented by hardware. When the functions are implemented by the hardware, it is possible, for instance, to increase the speed of processing and reduce power consumption.

The functions incorporated in the hardware may be implemented by programs like a virtual machine. When the functions incorporated in the hardware are implemented (virtualized) as programs, it is possible, for instance, to reduce installation space and simplify management.

The orders of processes described later are not restrictive. The processes may be performed in a parallel manner or in a different order as far as the dependence between the processes remains unchanged. For example, it is possible to reduce processing time by performing the processes in a parallel manner or reduce wait time by changing the orders of processes.

Computer System Operations

Operations of the computer system according to the present embodiment will now be outlined.

In the present embodiment, the node apparatuses 102, 103 access files stored by the storage control unit 116 in the manager apparatus 101. A data expression method used in the present invention is not limited to files, but can be applied to general data including data to be stored in a database. An example of file access gained by the node apparatus 102 is described below.

In the present embodiment, the node apparatus 102 accesses a file when a user instruction is issued through the input/output apparatus 112. In the present invention, however, file access is not triggered by the issuance of such an instruction alone. File access may be triggered, for instance, by an instruction issued by a program that is loaded into the storage apparatus 111 and executed by the CPU 110 or by an instruction that is issued by another node apparatus or computer by using a communication from the network interface 113 through the WAN 104. When file access is triggered by an instruction from a program or an apparatus other than the input/output apparatus 112 as described above, enhanced user-friendliness can be provided by automating file access or issuing a file access instruction from a remote place.

As described earlier, the present embodiment is configured so that the functions of the manager apparatus 101 and the node apparatuses 102, 103 are implemented by one manager control unit 115 and one or more units of the node control unit 120, which are the programs to be executed by the manager apparatus 101 and the node apparatuses 102, 103. The entire computer system is managed by the manager control unit 115.

Operations of the manager control unit 115 and the node control unit 120, which implement the functions, will now be described. Inter-program communication is established by using a communication technique based, for instance, on TCP (Transmission Control Protocol), which governs the communication between the program-executing computers. When programs are executed by the same computer, communication is established by using, for instance, an inter-process communication technique or a shared memory. A publicly known or well-known technology may be applied as an inter-program communication method or protocol.

In the present embodiment, the node control unit 120 stores a copy of a file stored by the storage control unit 116 in the manager apparatus 101 in the cache area 124 managed by the cache control unit 121 in the node apparatus 102. When access to the file is requested, the node control unit 120 uses the copy if possible. As the node apparatus 102 uses the copy of the file in the manager apparatus 101, the amount of communication between the node apparatus 102 and the manager apparatus 101 is reduced. This decreases the length of communication time, thereby increasing the speed of file access. The copy need not always be made on an individual file basis. It may be made in a smaller unit, that is, for example, on an individual sector basis, or in a larger unit, that is, on an individual directory basis. The copy may be stored when, for instance, the file is accessed for the first time, when a later-described mode change is applied, or at a specified point of time. The cache control unit 121 discards some of its copied data as needed so that the amount of copied data does not exceed the amount that can be effectively retained in the cache area 124. The copied data may be discarded when, for instance, a new copy is stored. The copied data may be discarded, for instance, on a LRU (least recently used) basis. Copies may be made, for instance, by a socket communication technique based on TCP. The present invention relates to a copy usage method. The timing and method of copy storage and discard and the method of making copies are generally disclosed by related cache technologies and communication technologies. Therefore, such publicly known or well-known technologies can be applied to them. Consequently, the detailed descriptions of such timing and methods are omitted from this document.

In the present embodiment, the cache control unit 121 uses the cache area 124 to store metadata in addition to a file itself. The metadata is the information about a file, including, for instance, the name and type of data, the summary of real data (checksum), write time, and access authority. In the present embodiment, the real data and metadata are stored in the storage area 1060 that is located in the manager apparatus 101 and managed by the storage control unit 116. In the present invention, the location for storing the real data and metadata is not limited to the storage area 1060. The real data and metadata need not always be stored in the storage area 1060 as far as they can be accessed by the manager control unit 115. The capacity of the storage apparatus 106 can be saved, for instance, by storing the metadata in the storage apparatus 106, storing the real data at a remote place, and accessing the real data through the WAN 104. The same holds for the cache area 124 of the cache control unit 121.

The following description relates to modes selected by the computer system in accordance with instructions from the manager control unit 115 in relation to individual files in the manager apparatus 101 that are to be accessed by the node apparatus 102, and to states in which the node control unit 120 is placed accordingly.

FIG. 2 shows state transitions between modes that are selected for individual files by the manager apparatus 101 in the computer system according to the present embodiment. In the present embodiment, the manager apparatus 101 in the computer system selects either a read-preferred mode 201 or a write-preferred mode 202 for individual files (or data). The timing and method of mode transitions will be described later.

FIG. 3 shows three states (node access methods) that are set in the node control unit 120 in accordance with a file-specific mode (access mode) selected by the manager apparatus 101 in the computer system according to the present embodiment. FIG. 3 also shows transitions between such three states. The three states represent a node access method that is based on a read master 301, a normal node 302, or a write master 303. These three states differ in the use of a copy that is stored in the cache area 124 by the cache control unit 121.

The node access method transitions between the read master 301 and the normal node 302 or transitions between the write master 303 and the normal node 302. The timing and method of transitioning will be described later. In the present embodiment, the node access method does not directly transition between the read master 301 and the write master 303. However, the present invention allows the node access method to directly transition between the read master 301 and the write master 303 when, for instance, transitioning procedures are consolidated. When the node access method directly transitions between the read master 301 and the write master 303, the associated control scheme and configuration can be simplified.

The node control unit 120 in the state of the read master 301 is hereinafter referred to as a read master. The node control unit 120 in the state of the normal node 302 is hereinafter referred to as a normal node. The node control unit 120 in the state of the write master 303 is hereinafter referred to as a write master. The node control unit 120 in the state of the read master 301 or write master 303 is hereinafter referred to as a master.

FIG. 4 is a diagram illustrating the relationship between the file access modes and the three states (node access methods) set for the node control unit 120.

When the computer system according to the present embodiment is in the read-preferred mode 201 for a certain file, the node control unit 120 for zero or more units of the node apparatus (102) becomes a read master 301 for the file, and the node control unit 120 for the other node apparatus (103) becomes a normal node 302. In the read-preferred mode, multiple node apparatuses can become a read master 301. When, on the other hand, the computer system is in the write-preferred mode 202 for a certain file, the node control unit 120 for one node apparatus (102) becomes a write master 303 and the node control unit 120 for the other node apparatus (103) becomes a normal node 302.

The following description relates to an operation that is performed by the node control unit 120 in a case where a copy is stored in the cache area 124 by the cache control unit 121. The operation will be described in detail with reference to a flowchart.

When the node control unit 120 in the normal node state reads a file in the read-preferred mode 201, the cache control unit 121 accesses the manager control unit 115, reads the metadata, and judges whether a copy of the file is available from the cache area 124. When a normal node demands to read a file in the read-preferred mode 201, the normal node asks the manager control unit 115 to let the normal node read the metadata and judges, in accordance with the metadata read from the manager control unit 115, whether the file is accessible. The method of judgment will be described later. When data in the local cache area 124 is accessible, the normal node reads the data in the cache area 124. When, on the other hand, the normal node cannot use the data in the local cache area 124, it reads data stored in another read master or the manager apparatus (101).

On the other hand, when the node control unit 120 is in the read master state, the node control unit 120 uses a copy of read target data stored in the local cache area 124 and its metadata without asking the manager control unit 115.

When the node control unit 120 writes a file in the read-preferred mode 201, the node control unit 120 accesses the manager control unit 115 to let the manager control unit 115 cause each node control unit 120, which serves as a read master 301, to transition to a normal node 302, allow the node control unit 120 to transmit the file, and cause the storage control unit 116 to write the contents of the file in the storage area 1060. When the normal node reads a file, it may access a read master instead of the manager control unit 115 for an increase in speed because the read master is relatively near it so that the required access time is relatively short.

When the node control unit 120 is a read master 301 in the read-preferred mode 201, it uses a copy of a read target file and its metadata without accessing the manager control unit 115. Therefore, the time of communication with the manager control unit 115 can be shortened to increase the speed of reading, which is a part of file access. As the number of read masters can be set as desired, all units of the node control unit 120 can become a read master while the number of normal nodes is reduced to zero. In the read-preferred mode 201, therefore, the speed of reading by multiple units of the node control unit 120 can be increased.

When, on the other hand, the node control unit 120 in the normal node state reads a file in the write-preferred mode 202, the cache control unit 121 accesses another node control unit 120 serving as a write master and acquires relevant metadata to judge whether a copy stored in the cache area 124 is available. On the other hand, when the node control unit 120 is a write master, it uses a copy stored in the local cache area 124 and its metadata without accessing the manager control unit 115 or another node control unit 120.

When the node control unit 120 in the normal node state writes a file in the write-preferred mode 202, it accesses a write master for another node control unit 120, transmits the file to the cache control unit 121 for the write master, and writes the contents of the file stored in the cache area 124 of the write master.

When the node control unit 120 is a write master, the cache control unit 121 writes the contents of a write target file stored in the local cache area 124. In the write-preferred mode, the node control unit 120 in the write master state can read or write a file in the node apparatus 102 without accessing the manager control unit 115 of the manager apparatus 101 or another node control unit 120. This makes it possible to shorten the time of communication with the manager apparatus 101, thereby increasing the speed of file access. In other words, the speed of read or write by a single write master can be increased in the write-preferred mode 202.

In the present embodiment, the manager control unit 115 judges in accordance with the pattern of access to each file whether the read-preferred mode 201 or the write-preferred mode 202 should be selected for each file that is stored in the storage apparatus 106 by the manager apparatus 101, and determines in a later-described manner whether each unit of the node control unit 120 should transition to the read master 301, the normal node 203, or the write master 303. This results in an increase in the speed of file access in the whole computer system.

Management Tables

Management tables required for the above-described computer system operations will now be described. The management tables include the master management table 117, the using file management table 118, and the access management table 119, which are managed by the manager control unit 115, and the master management table 122 and the using information management table 123, which are managed by the node control unit 120 of each node apparatus 102, 103. How the manager control unit 115 and the node control unit 120 use and write the management tables will be described later.

FIG. 5 shows an example of each master management table 117, 122. The master management table 117 is managed by the manager control unit 115. The master management table 122 is managed by the node control unit 120. The node control unit 120 exercises management in such a manner that the contents of the master management table 122 represent the entire or partial contents of the master management table 117.

As shown in FIG. 5, the master management tables 117, 122 indicate the relationship between a file path 401, an access mode 402, and a master 403. The master management tables 117, 122 store the access mode 402 that indicates whether the read-preferred mode 201 or the write-preferred mode 202 is selected for a file specified by the file path 401. The master management tables 117, 122 also store a node apparatus identifier or name in the field of the master 402 to indicate a node apparatus whose node control unit 120 serves as the read master 301 or the write master 303 for the file. In FIG. 5, it is assumed that "NODE 1" represents the node apparatus 102 whereas "NODE 2" represents the node apparatus 103. Some or all entries concerning the read-preferred mode 201 in the field of the access mode 402 may be omitted from the master management table 122 stored by the node control unit 120 for each node apparatus for capacity saving purposes. In such an instance, however, when the node control unit 120 of the normal node attempts to read the file, the node control unit 120 cannot access the read master omitted from the field of the master 403 instead of the manager control unit 115. When all entries concerning the read-preferred mode 201 are omitted, the description of the access mode 402 can be omitted because the write-preferred mode 202 can be identified as far as it has entries. A complete file path need not always be entered in the field of the file path 401. For example, the capacity of each master management table can be saved by indicating only a file name with files handled by the computer system limited to a specific directory, indicating a directory path for the purpose of specifying one or more files contained in a specific directory, or describing conditions, such as an extension, for the purpose of defining a collection of target files. As regards the field of the master 403, too, the name of a node need not always be indicated as far as a target unit of the node control unit 120 can be identified. For example, the capacity of each master management table can be saved by using an expression method other than a specific IP (Internet Protocol) address.

FIG. 6 shows an example of the using information management table 123, which is managed by the node control unit 120 of each node apparatus 102, 103. Each entry in the using information management table 123, which stores information about files used by the node control unit 120, includes a file path 501, a type 503, an ID 503, a user name 504, an access destination 505, a transfer size 506, a transfer time 507, acquired metadata 508, and an acquisition time 509. Each entry is identified by the ID 503. The file path 501 indicates a file used by the node control unit 120. The type 502 indicates a method of accessing the file (write or read). The user name 504 indicates the name of a user that uses the file. The user name 504 need not be the actual name of a user as far as it can be differentiated from the names of the other users. For example, a numerical value may be used to identify each user for the purpose of saving the capacity of the using information management table 123. If no user management is required, the user name 504 may be omitted. The identifier of a program that uses the file may alternatively be used as the user name 504. The access destination 505 indicates the manager control unit 115, the node control unit 120, or the cache control unit 121, which will be an access destination for using real data in the file. The transfer size 506 indicates the size of data (the number of bytes) transferred when the access destination 505 is accessed. The transfer time 507 indicates the time required for the transfer of the file. The field of the acquired metadata 508 stores metadata that is acquired from the access destination 505 and stored by the node control unit 120. The acquisition time 509 indicates the time at which the file was accessed. When the node control unit 120 accesses the local cache area 124, the value "0" is entered as the transfer size 506 and as the transfer time 507.

The using information management table 123 reveals relevant information including the name of a file accessed by the node control unit 120 of each node apparatus 102, 103, the metadata about real data in the file, and the transfer time required for accessing the real data. User authentication can be achieved by using the Kerberos authentication method or other method provided by a publicly known or well-known technology. Therefore, the method of user authentication is not described in connection with the present embodiment.

FIG. 7 shows an example of the access management table 119, which is managed by the manager control unit 115. The access management table 119 manages the history of access to each file.

Each entry in the access management table 119 includes a node name 601, an access destination 602, a time 603, a transfer size 604, a transfer time 605, a transfer direction 606, and a round-trip time (RTT) 607. The access management table 119 records information about communication that is established when the node control unit 120 identified by the node name 601 accesses real data stored at the access destination 602. The access destination 602 includes information about an accessed file as well as an identifier of a node apparatus or of the manager apparatus 101. Either a file path or file name may be recorded as the information about the accessed file.

The field of the time 603 records the time at which the file was accessed. The field of the transfer size 604 records the size of data transferred at the time of access. The field of the transfer time 605 records the time required for the transfer. The field of the transfer direction 606 records the direction of the transfer, which is either the direction from the node indicated in the field of the node name 601 to the access destination 602 ("WRITE" in the example in the figure) or the direction from the access destination 602 to the node indicated in the field of the node name 601 ("READ" in the example in the figure). The field of the RTT 607 indicates the round-trip time (RTT) that is required for a round trip between the node indicated in the field of the node name 601 and the access destination 602 at the time of access to the file. Entries matching specified conditions may be deleted from the access management table 119 at, for example, a preselected time. Such entries are deleted, for example, at a preselected time, at preselected time intervals, when a predetermined number of entries or a predefined data size is exceeded, when the access management table 119 is read, or when a new entry is added. The specified conditions are used when, for instance, the time indicated in the field of the time 603 is earlier than the preselected time. The timing of entry deletion is specified, for instance, by using a setup file or issuing an instruction from the outside. The method and timing of specifying and the procedure for condition setup are not described here because they can be defined by using a publicly known or well-known technology at the time of database/file system maintenance.

FIG. 8 shows an example of the using file management table 118 that is managed by the manager control unit 115. The using file management table 118 manages currently open files. Each entry in the using file management table 118 includes a file path 701, a type 702, an ID 703, a user name 704, and a node 705. The using file management table 118 stores information about files that each unit of the node control unit 120 uses after accessing the manager control unit 115.

Each entry is identified by the ID 703. The field of the file path 701 stores the path of a file that the node control unit 120 for each node apparatus 102, 103 uses after accessing the manager control unit 115. The field of the type 702 stores a method of accessing the file, namely, WRITE or READ. The field of the user name 704 stores the name of a user of the file. The using file management table 118 permits the manager control unit 115 to become aware of the file used by each unit of the node control unit 120.

Node Operations

Figure 9:
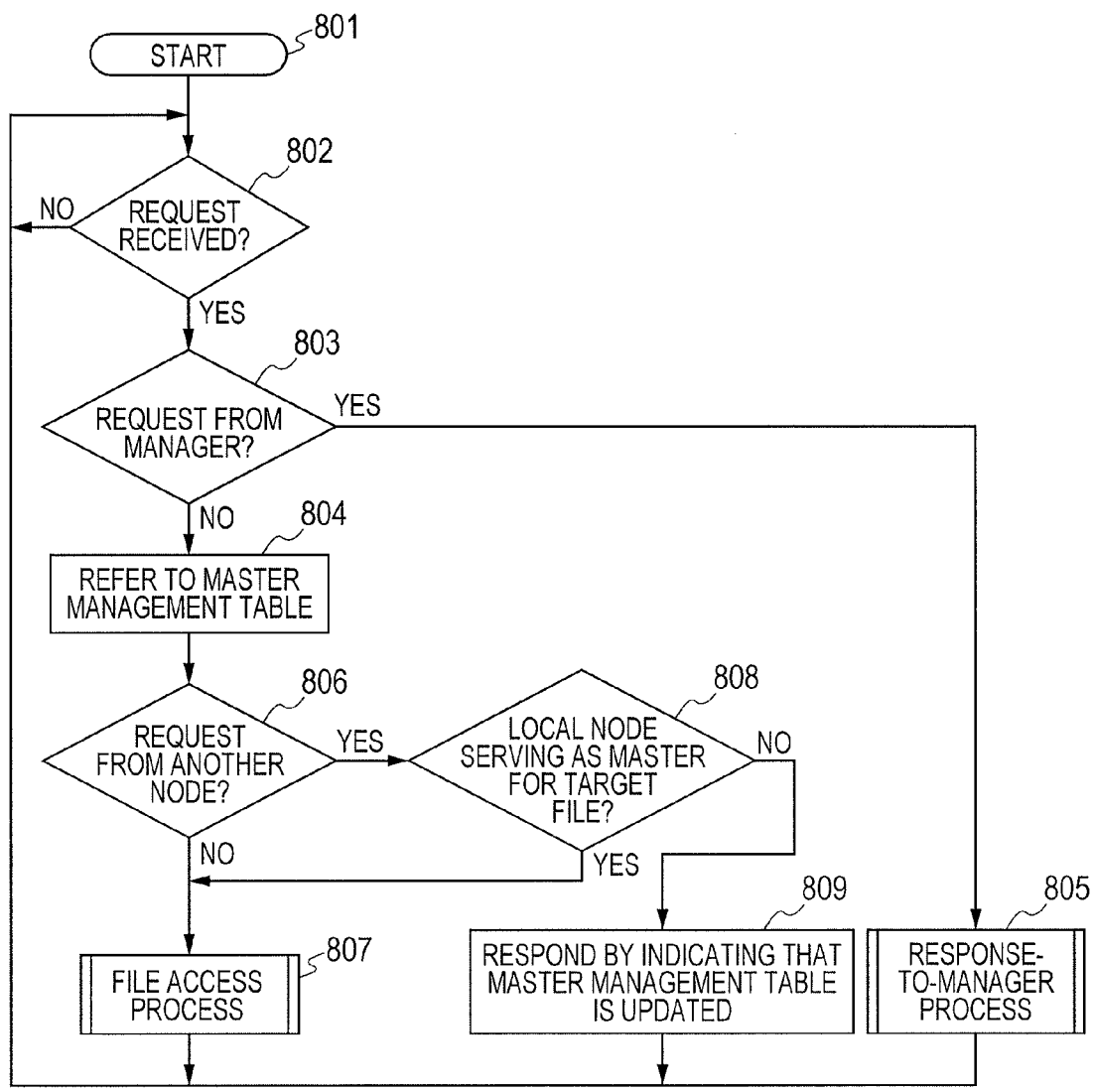
FIG. 9 is a flowchart illustrating processes performed by the node apparatuses according to the first embodiment of the present invention.

FIG. 9 is a flowchart illustrating processes performed by the node control unit 120. When started in the node apparatus 102, the node control unit 120 proceeds from a start state 801 to step 802. In step 802, the node control unit 120 judges whether it has received a request from the inside or from the outside. If the result of judgment is true, the node control unit 120 proceeds to step 803. If the result is false, the node control unit 120 proceeds to step 802. The request from the inside is, for example, a file read request or file write request from the input/output apparatus 112. The request from the outside is, for example, a master management table change request from the manager control unit 115 or a state transition request for the node control unit 120. Processes in step 802 may be performed in a parallel manner by using, for instance, a multi-threading or multi-processing scheme to improve response to an access request.

In step 803, the node control unit 120 analyzes the request received in step 802 and judges whether the request is received from the manager control unit 115. If the result of judgment is true, the node control unit 120 proceeds to step 805. If the result is false, the node control unit 120 proceeds to step 804. In step 805, the node control unit 120 performs a response-to-manager process and then returns to step 802. The response-to-manager process will be described later. In step 804, the node control unit 120 reads the master management table 122 for a sender of the received request, and then proceeds to step 806.

In step 806, the node control unit 120 judges whether an access request is received from another node control unit 120 (hereinafter referred to as the other node). If the result of judgment is true, the node control unit 120 proceeds to step 808. If the result is false, the node control unit 120 proceeds to step 807. The node control unit 120 proceeds from step 806 to step 807 if, for instance, a file read request or a file write request is received from a user through the input/output apparatus 112 or a request is received from another program running in the node apparatus 102.

In step 808, the node control unit 120 judges, in accordance with the information in the master management table 122 read in step 804, which relates a read or write target file (hereinafter referred to as the target file) designated by the received request, whether the master is the local node control unit 120 (hereinafter referred to as the local node). If the result of judgment is true, the node control unit 120 proceeds to step 807. If the result is false, the node control unit 120 proceeds to step 809.

In step 807, the node control unit 120 performs a file access process relative to a file in the local node, responds to the requester, and returns to step 802. The file access process will be described later. In step 809, the node control unit 120 responds that the master management table 122 has been updated to the node control unit 120 of the other node apparatus that has accessed, and returns to step 802. The node control unit 120 may proceed to step 809 if the node control unit 120 of the other node apparatus (the other node) that has accessed reads old information in the master management table 122. The master management table update and the operation performed by the node control unit 120 subsequently to a response will be described later.

The method of request reception and analysis and the method of accessor identification are not described here because they can be generally implemented, for instance, by a server program that is based on a publicly known or well-known technology. When the master management table 122 is used to determine which node control unit 120 is a read or write master, entries are searched to locate an entry having a file path 401 corresponding to an access target file, and then the field of the master 403 for the located entry is read. If no such entry is located, it is concluded that no node control unit 120 is a master.

In the file access process in step 807, a process for responding to a file access request is performed. The file access request includes six types of requests, namely, an open request, a metadata read request, a real data read request, a metadata write request, a real data write request, and a close request. A file is accessed in the form of either read access or write access. Such file access is gained by combining the above-mentioned six types of requests in a particular order. Read access is gained by issuing the open request, repeating a combination of the metadata read request and real data read request zero or more times, and issuing the close request.

On the other hand, write access is gained by issuing the open request, repeating a combination of the metadata read request, metadata write request, and real data write request zero or more times, and issuing the close request. A response to the open request contains an ID for identifying an access target (hereinafter referred to as the FID). Five types of requests other than the open request are issued with the FID indicated.

The FID varies from one access to another even if the same file is simultaneously open. When a file access request is to be issued to another node control unit 120 or the manager control unit 115, the FID of a response to the open request is stored in the field of the ID 503 for an entry in the using information management table 123. When a file access request other than the open request is to be issued, the ID 503 of the entry is used.

Two or more of the above-mentioned six types of requests may be combined and used in one communication. When, for instance, the open request and the metadata read request are issued at a time, the response to file access can be improved in a WAN in which the round-trip time is long. When multiple requests are issued at a time, the node control unit 120 processes them in sequence. The file access process concerning the above-mentioned six types of requests will be described below with reference to a flowchart.

Figure 10:
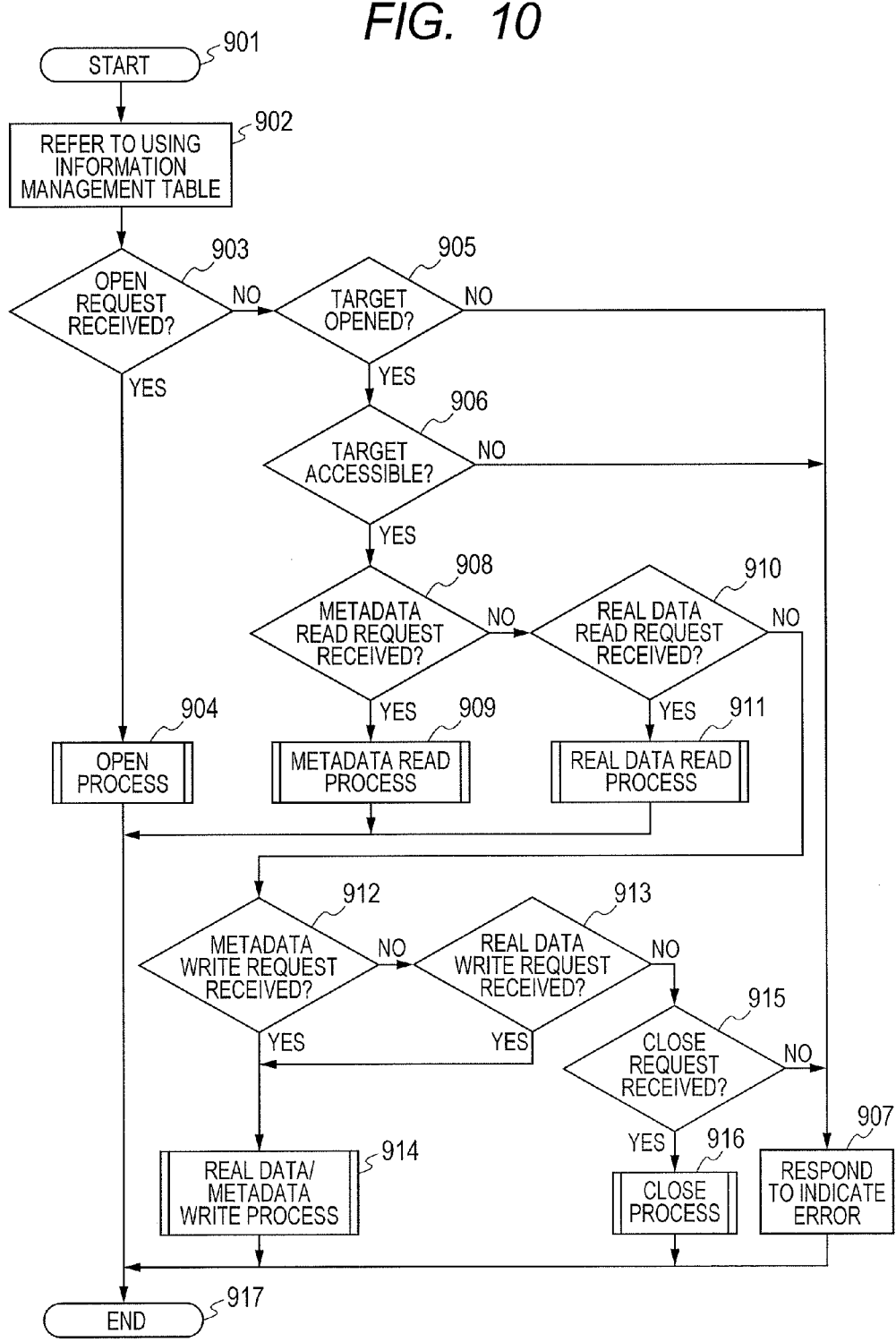
FIG. 10 is a flowchart illustrating a file access process performed by the node apparatuses according to the first embodiment of the present invention.

FIG. 10 shows a flowchart illustrating the file access process (step 807 shown in FIG. 9) performed by the node control unit 120. First of all, the node control unit 120 proceeds from a start state 901 to step 902. In step 902, the node control unit 120 reads the using information management table 123 for a file designated by a received request (hereinafter referred to as the target file), and then proceeds to step 903. In step 903, the node control unit 120 judges whether the open request is received. If the result of judgment is true, the node control unit 120 proceeds to step 904. If the result is false, the node control unit 120 proceeds to step 905.

In step 904, the node control unit 120 performs an open process on the target file because the open process is specified by the received request, and then proceeds to an end state 917. The open process will be described later. In step 905, the node control unit 120 uses the using information management table 123, which was read in step 902, to judge whether the open process in step 904 is already performed on the target file. If the result of judgment is true, the node control unit 120 proceeds to step 907. More specifically, if the ID 503 of any entry in the using information management table 123 has the same value as the FID attached to the file access request, the node control 120 concludes that the result is true. If there is no such entry, the node control 120 concludes that the result is false.

In step 906, the node control unit 120 judges whether the target file is accessible. If the result of judgment is true, the node control unit 120 proceeds to step 907. More specifically, the node control unit 120 reads the metadata stored in the using information management table 123 to judge whether the access of a user and the node control unit 120 to the target file is granted, a write request or other illegal request is received for read access, and the target file is accessible from the viewpoint, for instance, of locked state, permission, and access authority. In other words, before accessing real data in the target file, the node control unit 120 checks the acquired metadata to judge whether the real data is available.

In step 908, the node control unit 120 judges whether the received request is a metadata read request. If the result of judgment is true, the node control unit 120 proceeds to step 909. If the result is false, the node control unit 120 proceeds to step 910. In step 909, the node control unit 120 performs a metadata read process and then proceeds to the end state 917. The metadata read process will be described later.

In step 910, the node control unit 120 judges whether the received request is a real data read request. If the result of judgment is true, the node control unit 120 proceeds to step 911. If the result is false, the node control unit 120 proceeds to step 912. In step 911, the node control unit 120 performs a real data read process and then proceeds to the end state 917. The real data read process will be described later.

In step 912, the node control unit 120 judges whether the received request is a metadata write request. If the result of judgment is true, the node control unit 120 proceeds to step 914. If the result is false, the node control unit 120 proceeds to step 913. In step 913, the node control unit 120 judges whether the received request is a real data write request. If the result of judgment is true, the node control unit 120 proceeds to step 914. If the result is false, the node control unit 120 proceeds to step 915. In step 914, the node control unit 120 performs a real data/metadata write process on the target file and then proceeds to the end state 917. The real data/metadata write process will be described later.

In step 915, the node control unit 120 judges whether the received request is a close request. If the result of judgment is true, the node control unit 120 proceeds to step 916. If the result is false, the node control unit 120 proceeds to step 907. In step 916, the node control unit 120 performs a close process on the target file and then proceeds to the end state 917. The close process will be described later. In step 907, the node control unit 120 responds to indicate an error and then proceeds to the end state 917.

Figure 11:
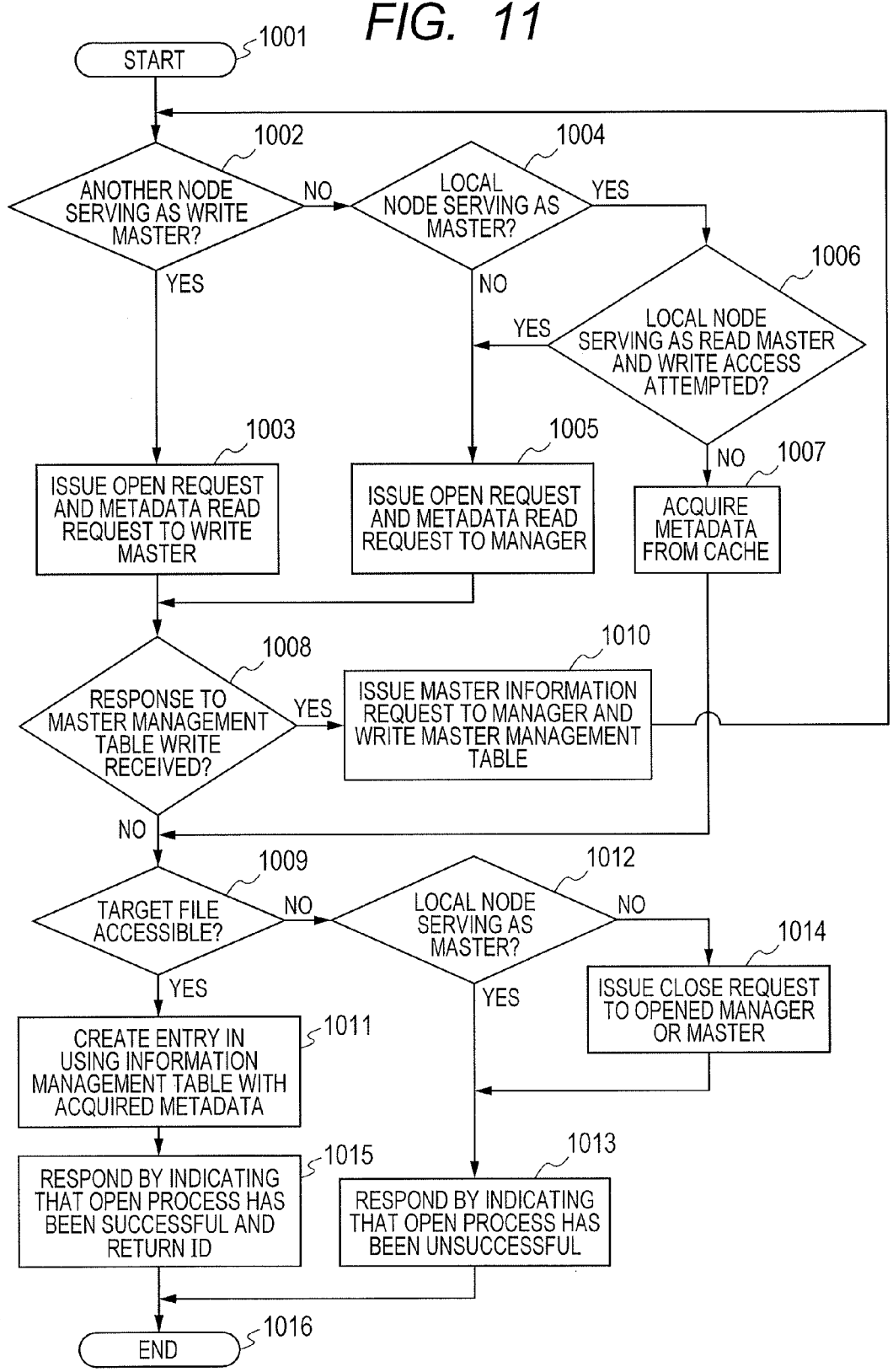
FIG. 11 is a flowchart illustrating an open process performed by the node apparatuses according to the first embodiment of the present invention.

In the open process (step 904 shown in FIG. 10), the target file is opened to write the using information management table 123 and make file access requests other than an open request processable. FIG. 11 is a flowchart illustrating the open process performed by the node control unit 120. First of all, the node control unit 120 proceeds from a start state 1001 to step 1002. In step 1002, the node control unit 120 checks the information in the master management table 122 read in step 804 to judge whether the other node is a write master for the target file. If the result of judgment is true, the node control unit 120 proceeds to step 1003. If the result is false, the node control unit 120 proceeds to step 1004.

In step 1003, the node control unit 120 accesses the node control unit 120 of the other node, which is the write master, issues an open request and a metadata read request of a target file, and proceeds to step 1008.

In step 1004, the node control unit 120 judges whether the local node is a master. If the result of judgment is true, the node control unit 120 proceeds to step 1005. If the result is false, the node control unit 120 proceeds to step 1006. In step 1006, the node control unit 120 judges whether the local node is a read master and whether the request is a metadata or real data write request. If the result of judgment is true, the node control unit 120 proceeds to step 1005. If the result is false, the node control unit 120 proceeds to step 1007.

In step 1005, the node control unit 120 accesses the manager control unit 115, issues an open request and a metadata read request of a target file, and proceeds to step 1008. In step 1008, the node control unit 120 checks a response from the node control unit 120 serving as the write master 303 in step 1003 and a response from the manager control unit 115 in step 1005 to judge whether there is a response to master management table update. If the result of judgment is true, the node control unit 120 proceeds to step 1010. If the result is false, the node control unit 120 proceeds to step 1009. The response to master management table update, which is received from the write master of the other node, is made in step 809 shown in FIG. 9. The response to master management table update that is made by the manager control unit 115 will be described later.

In step 1010, the node control unit 120 accesses the manager control unit 115, issues a master information request to acquire the master management table 117, writes the master management table 122 in accordance with a response from the manager control unit 115, and proceeds to step 1002. The process performed in the manager control unit 115 will be described later.

In step 1007, the node control unit 120 causes the cache control unit 121 to acquire the metadata stored in the cache area 124 as the local node is a master. Upon metadata acquisition, the node control unit 120 proceeds to step 1009.

In step 1009, the node control unit 120 uses the metadata acquired in step 1003, 1005, or 1007 to judge whether the target file is accessible. If the result of judgment is true, the node control unit 120 proceeds to step 1011. If the result is false, the node control unit 120 proceeds to step 1012. The judgment method used in step 1009 is the same as that is used in step 906.

In step 1011, the node control unit 120 uses the metadata acquired in step 1003, 1005, or 1007 as the acquired metadata 508 to create an entry in the using information management table 123, and then proceeds to step 1015. The node control unit 120 creates the entry in the using information management table 123 by setting the path of the target file in the field of the file path 501, setting either read access or write access in the field of the type 502, setting an appropriate serial number or other value different from the IDs of the other entries in the field of the ID 503, setting the name of a user who has gained access in the field of the user name 504, setting an access destination from which the metadata is acquired in the field of the access destination 505, setting the value 0 (zero) in the fields of the transfer size 506 and transfer time 507, and setting the time of creation of the entry in the field of the acquisition time 509.

In step 1015, the node control unit 120 responds to the requester by indicating that the open process has been successful, returns the ID 503 of the entry created in step 1011 as the FID, and proceeds to an end state 1016.

In step 1012, the node control unit 120 checks the information in the master management table 122 read in step 804 and judges whether the local node is a master. If the result of judgment is true, the node control unit 120 proceeds to step 1013. If the result is false, the node control unit 120 proceeds to step 1014. In step 1014, the node control unit 120 accesses the write master if step 1003 was performed or accesses the manager control unit 115 if step 1005 was performed, issues a close request, and then proceeds to step 1013. In step 1014, the node control unit 120 may decrease the number of variables by performing the same judgment procedures as in steps 1002 and 1004 instead of memorizing which step was performed. In step 1013, the node control unit 120 responds to the requester by indicating that the open process has been unsuccessful, and then proceeds to the end state 1016.

By performing the above processing steps, the node control unit 120 performs the open process on the target file designated by the received request.

Figure 12:
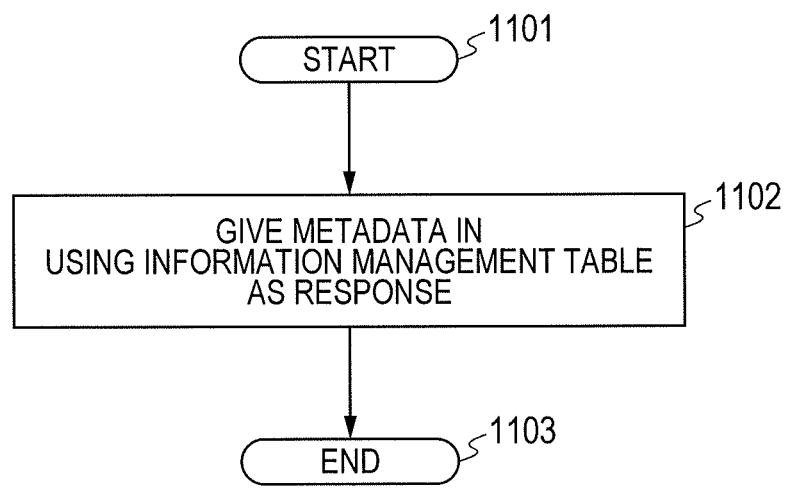
FIG. 12 is a flowchart illustrating a metadata read process performed by the node apparatuses according to the first embodiment of the present invention.

FIG. 12 is a flowchart illustrating the metadata read process (step 900 shown in FIG. 10) performed by the node control unit 120. First of all, the node control unit 120 proceeds from a start state 1101 to step 1102. In step 1102, the node control unit 120 gives the acquired metadata 508 of an entry about the target file in the using information management table 123, which was read in step 902 shown in FIG. 10, as a response to the requester, and then proceeds to an end state 1103.

Figure 13:
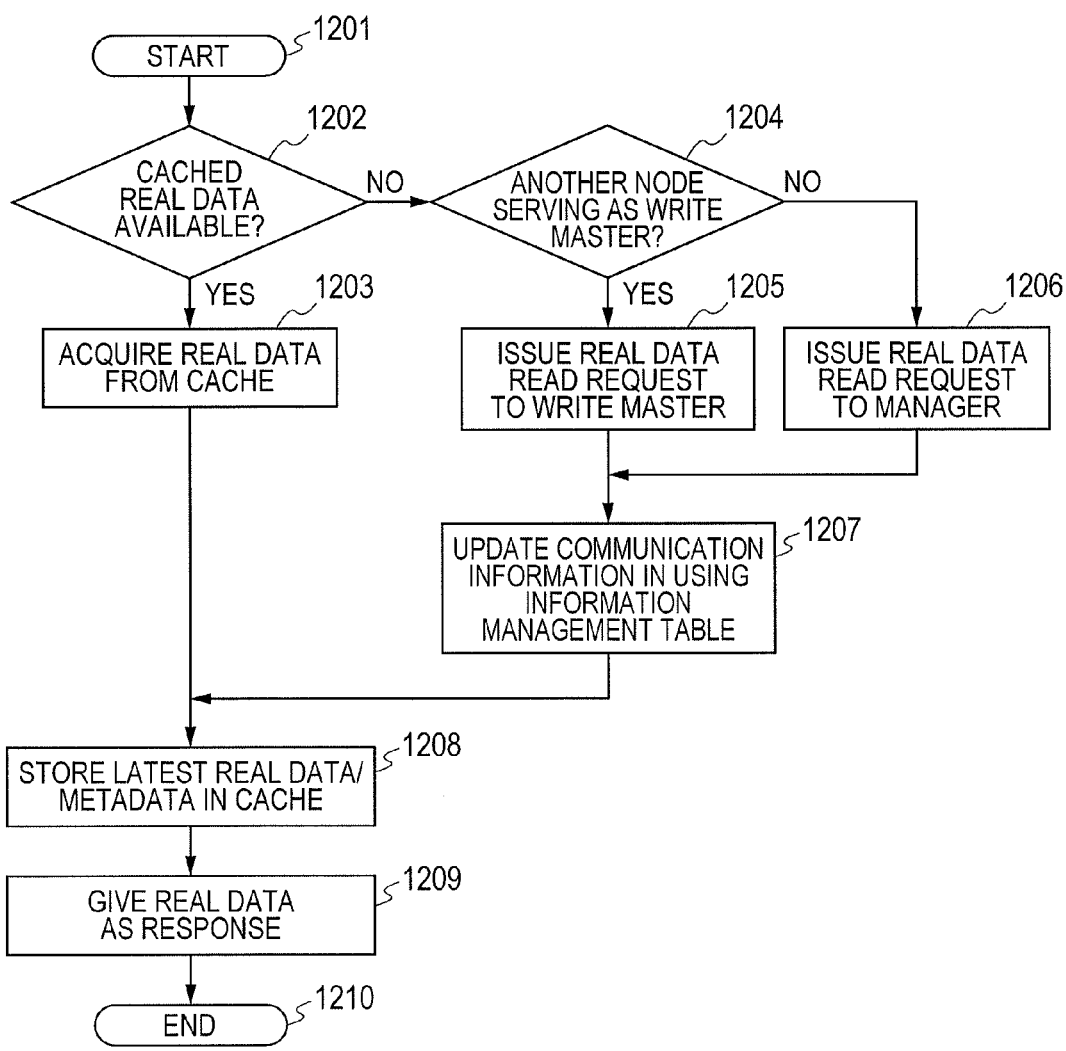
FIG. 13 is a flowchart illustrating a real data read process performed by the node apparatuses according to the first embodiment of the present invention.

FIG. 13 is a flowchart illustrating the real data read process (step 911 shown in FIG. 10) that is performed by the node control unit 120. First of all, the node control unit 120 proceeds from a start state 1201 to step 1202. In step 1202, the node control unit 120 checks the acquired metadata 508 of the entry about the target file in the using information management table 123, which was read in step 902 shown in FIG. 10, and judges whether real data in the cache area 124 is available. If the result of judgment is true, the node control unit 120 proceeds to step 1203. If the result is false, the node control unit 120 proceeds to step 1204.

In step 1202, if the real data is stored in the cache area 124 of the local node and the metadata in the using information management table 123 agrees with the metadata stored in the cache area 124, the node control unit 120 concludes that the result of judgment is true. In this instance, the processing time required for checking for metadata agreement may be reduced by comparing some portion of the metadata such as write time and file size.

In step 1204, the node control unit 120 checks the information in the master management table 122 read in step 804 shown in FIG. 9 to judge whether another node is a write master. If the result of judgment is true, the node control unit 120 proceeds to step 1205. If the result is false, the node control unit 120 proceeds to step 1206.

In step 1203, the node control unit 120 accesses the cache control unit 121, acquires the real data stored in the cache area 124, and then proceeds to step 1208.

In step 1205, the node control unit 120 accesses the write master of the other node, issues a real data read request concerning the target file, and then proceeds to step 1207. In step 1206, the node control unit 120 accesses the manager control unit 115, issues a real data read request concerning the target file, and then proceeds to step 1207.

In step 1207, the node control unit 120 updates a target entry in the using information management table 123 by using the communication information (RTT, etc.) conveyed at the time of response to the real data read request in steps 1205 and 1206, and then proceeds to step 1208. More specifically, the node control unit 120 locates an entry whose value in the field of the ID 503 in the using information management table 123 agrees with the FID communicated at the time of data access request, measures the amount and time of real data transfer concerning the located entry as the communication information to be conveyed at the time of response to the real data read request, and adds the measured transfer amount to the value in the field of the transfer size 506 and the measured transfer time to the value in the field of the transfer time 507.

In step 1208, the node control unit 120 stores the real data acquired in step 1203, 1205, or 1206 in the cache area 124, stores the acquired metadata 508 about the target entry of the using information management table 123 in the cache area 124, and then proceeds to step 1209. In step 1209, the node control unit 120 gives the real data stored in step 1208 as a response, and then proceeds to an end state 1210.

By performing the above processing steps, the node control unit 120 reads the real data from the write master or the manager apparatus 101 and stores the real data and metadata in the cache area 124 of the local node.

Figure 14:
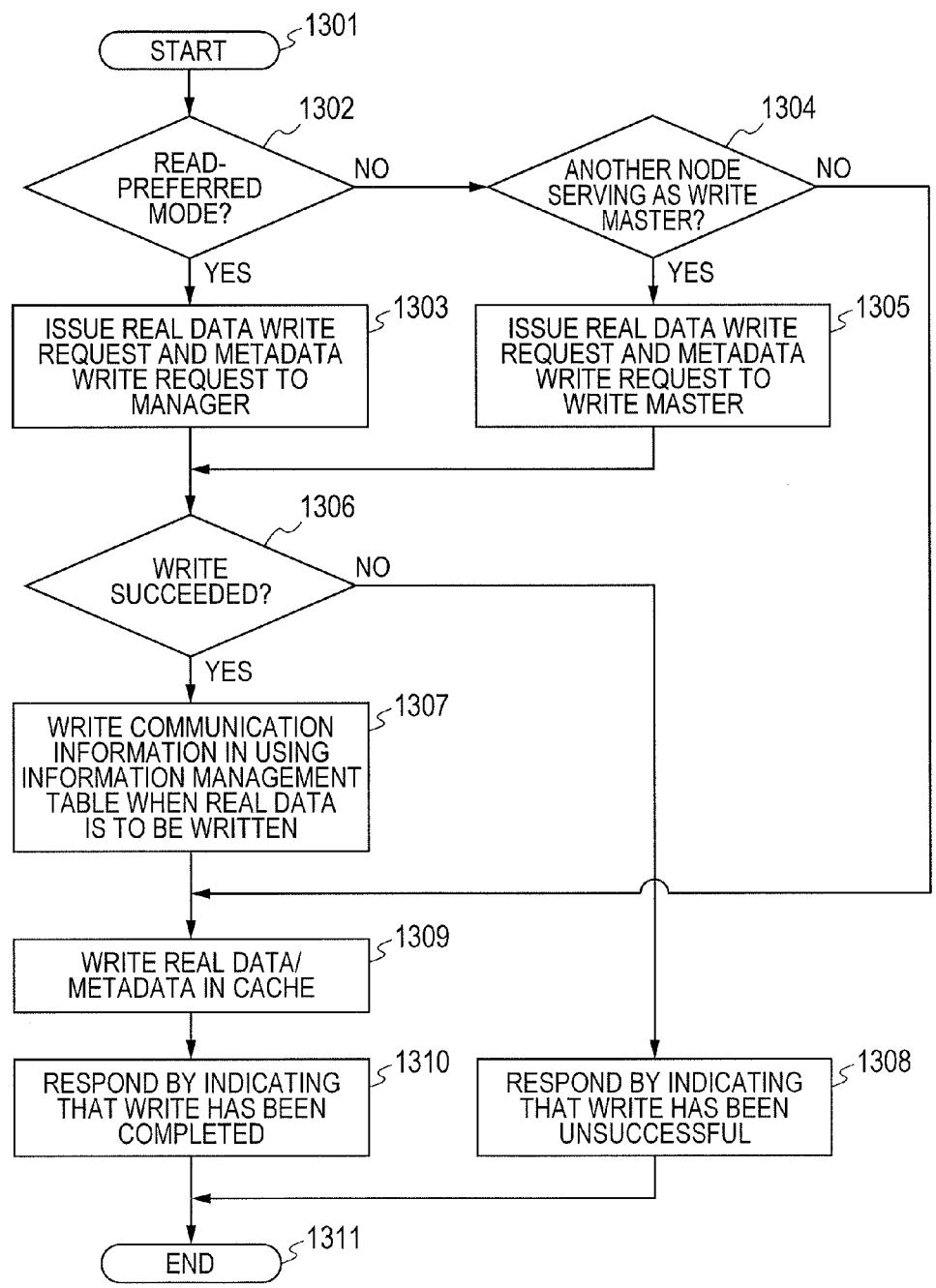
FIG. 14 is a flowchart illustrating a real data/metadata write process performed by the node apparatuses according to the first embodiment of the present invention.

FIG. 14 is a flowchart illustrating the real data/metadata write process (step 914 shown in FIG. 10) that is performed by the node control unit 120. First of all, the node control unit 120 proceeds from a start state 1301 to step 1302. In step 1302, the node control unit 120 checks the information in the master management table 122 read in step 804 shown in FIG. 9, and judges whether the target file is in the read-preferred mode. If the result of judgment is true, the node control unit 120 proceeds to step 1303. If the result is false, the node control unit 120 proceeds to step 1304.

In step 1303, as the target file is in the read-preferred mode, the node control unit 120 accesses the manager control unit 115, issues a real data write request and a metadata write request, and then proceeds to step 1306.

In step 1304, as the target file is not in the read-preferred mode, the node control unit 120 judges in accordance with the information in the master management table 122 whether another node is a write master for the target file. If the result of judgment is true, the node control unit 120 proceeds to step 1305. If the result is false, the node control unit 120 proceeds to step 1309.

In step 1305, the node control unit 120 accesses the write master of the other node, issues a real data write request and metadata write request concerning the target file, and then proceeds to step 1306. In step 1306, the node control unit 120 notes a response from the manager apparatus 101 or the other node that concerns the real data write request and metadata write request in step 1303 or 1305, and judges whether the write has been successful. If the result of judgment is true, the node control unit 120 proceeds to step 1307. If the result is false, the node control unit 120 proceeds to step 1308.

In step 1307, if the write request is a real data write request, the node control unit 120 writes the target entry in the using information management table 123 by using the communication information conveyed at the time of real data write request in step 1303 or 1305. If, on the other hand, the write request is not a real data write request, the node control unit 120 skips step 1307 and proceeds to step 1309. More specifically, the node control unit 120 writes the target entry in the using information management table 123 by locating an entry whose value in the field of the ID 503 in the using information management table 123 agrees with the FID communicated at the time of data access request, measuring the amount and time of real data transfer concerning the located entry as the communication information to be conveyed at the time of real data write request in step 1303 or 1305, and adding the measured transfer amount to the value in the field of the transfer size 506 and the measured transfer time to the value in the field of the transfer time 507.

In step 1309, the node control unit 120 writes the real data or metadata in the cache area 124 in accordance with the real data write request or metadata write request concerning the target file, and then proceeds to step 1310.

In step 1310, the node control unit 120 responds to the requester concerning the target file by indicating that the write has been completed, and then proceeds to an end state 1311. In step 1308, on the other hand, the node control unit 120 responds to the requester concerning the target file by indicating that the write has been unsuccessful, and then proceeds to the end state 1311.

In the present embodiment, the real data write request and metadata write request are collectively handled by the real data/metadata write process. The reason is that the metadata is also written under normal conditions when the real data is written. When only the metadata is to be written, the present embodiment does not issue the real data write request in the steps indicated in FIG. 14. Obviously, the present invention is not limited to the present embodiment. The process for handling the real data write request and the process for handling the metadata write request may be separately performed to increase the visibility of programs.

Figure 15:
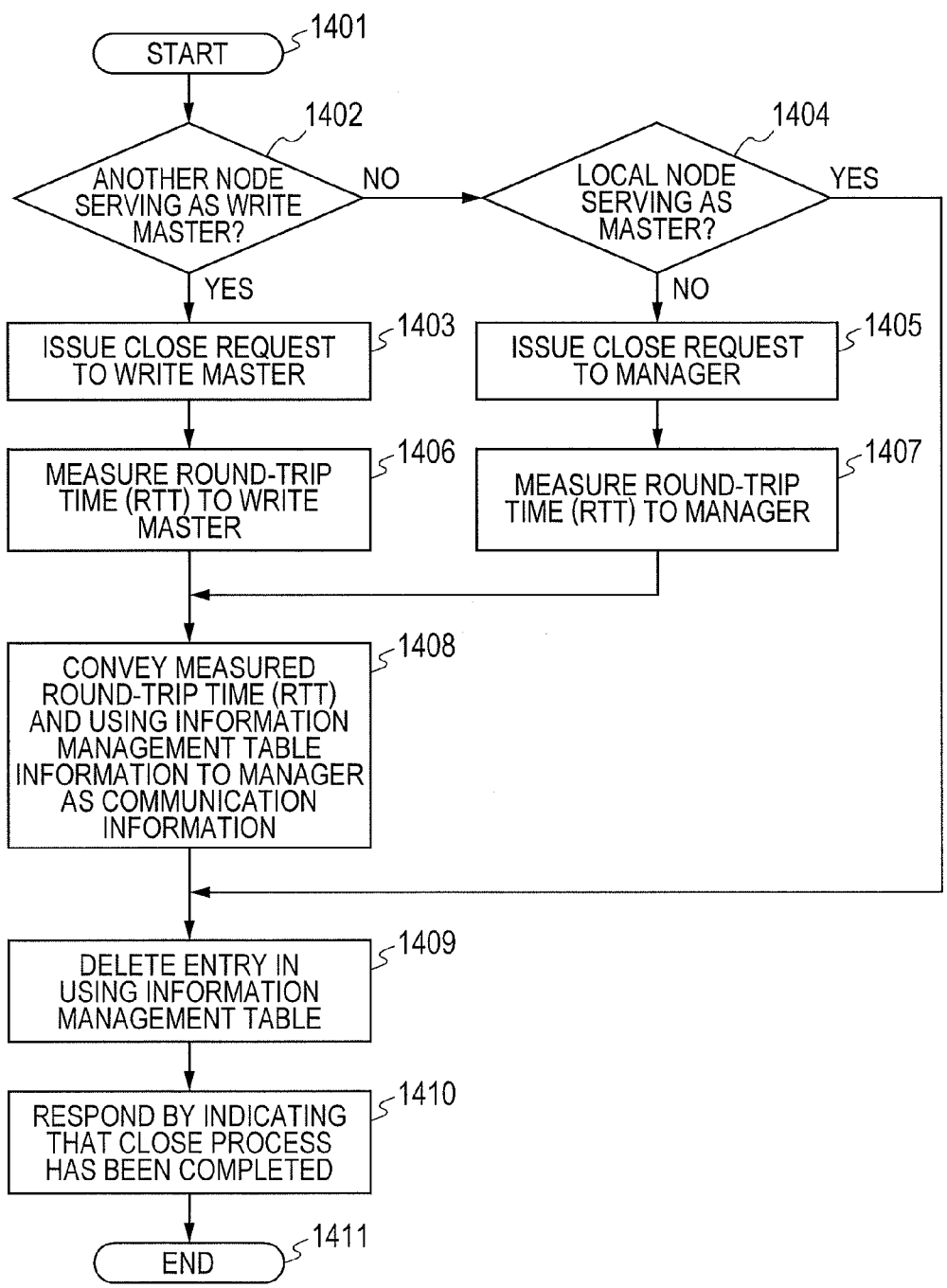
FIG. 15 is a flowchart illustrating a close process performed by the node apparatuses according to the first embodiment of the present invention.

FIG. 15 is a flowchart illustrating the close process (step 916 shown in FIG. 10) that is performed by the node control unit 120. First of all, the node control unit 120 proceeds from a start state 1401 to step 1402. In step 1402, the node control unit 120 checks the information in the master management table 122 read in step 804 shown in FIG. 9, and judges whether the other node is a write master. If the result of judgment is true, the node control unit 120 proceeds to step 1403. If the result is false, the node control unit 120 proceeds to step 1404.

In step 1403, the node control unit 120 accesses the write master in the other nodes, issues a close request concerning a target file, and proceeds to step 1406. In step 1406, the node control unit 120 measures the round-trip time to the write master and then proceeds to step 1408.

In step 1404, the node control unit 120 judges in accordance with the information in the master management table 122 whether the local node is a master. If the result of judgment is true, the node control unit 120 proceeds to step 1408. If the result is false, the node control unit 120 proceeds to step 1405. In step 1405, as the manager apparatus 101 is a write master, the node control unit 120 accesses the manager control unit 115, issues a close request concerning the target file, and then proceeds to step 1407. In step 1407, the node control unit 120 measures the round-trip time to the manager control unit 115, and then proceeds to step 1408.

In step 1408, the node control unit 120 accesses the manager control unit 115, conveys the round-trip time measured by the node control unit 120 in step 1406 or 1407 and the information about a target entry in the using information management table 123 as the communication information (communication information conveyance), and proceeds to step 1409.

In step 1409, the node control unit 120 deletes the target entry concerning the closed target file from the using information management table 123, and then proceeds to step 1410. In step 1410, the node control unit 120 responds to the requester by indicating that the close process has been completed, and then proceeds to an end state 1411.

The target entry in the using information management table 123, which is handled in steps 1408 and 1409, is an entry whose value in the field of the ID 503 in the using information management table 123 agrees with the FID communicated at the time of data access request.

By performing the above processing steps, the node control unit 120 of the node apparatus 102 requests the write master to perform a close process on the target file designated by a close request, communicates the round-trip time to the manager control unit 115, and deletes the target file entry from the using information management table 123 to conclude the close process.

The response-to-manager process (step 805) depicted in FIG. 9 is performed to handle requests that are issued from the manager control unit 115 of the manager apparatus 101 to the node control unit 120. More specifically, the process handles a state transition request for the node control unit 120 and a master management table update request. The manager control unit 115 issues the state transition request to the node control unit 120 to specify the state transition between the read master 301, the normal node 302, and the write master 303, which are described with reference to FIGS. 3 and 4.

To cause the transitions indicated in FIG. 3, the state transition request for the node control unit 120 involves instructions for four different transitions, namely, the transition from the read master 301 to the normal node 302, the transition from the normal node 302 to the read master 301, the transition from the write master 303 to the normal node 302, and the transition from the normal node 302 to the write master 303. Further, as the master management table update request is regarded as a request for transition to the same state, the requests issued from the manager control unit 115 to the node control unit 120 involve a total of five different transition instructions. Thus, the response-to-manager process is performed to handle the transition instructions. The response-to-manager process will be described below with reference to a flowchart.

Figure 16:
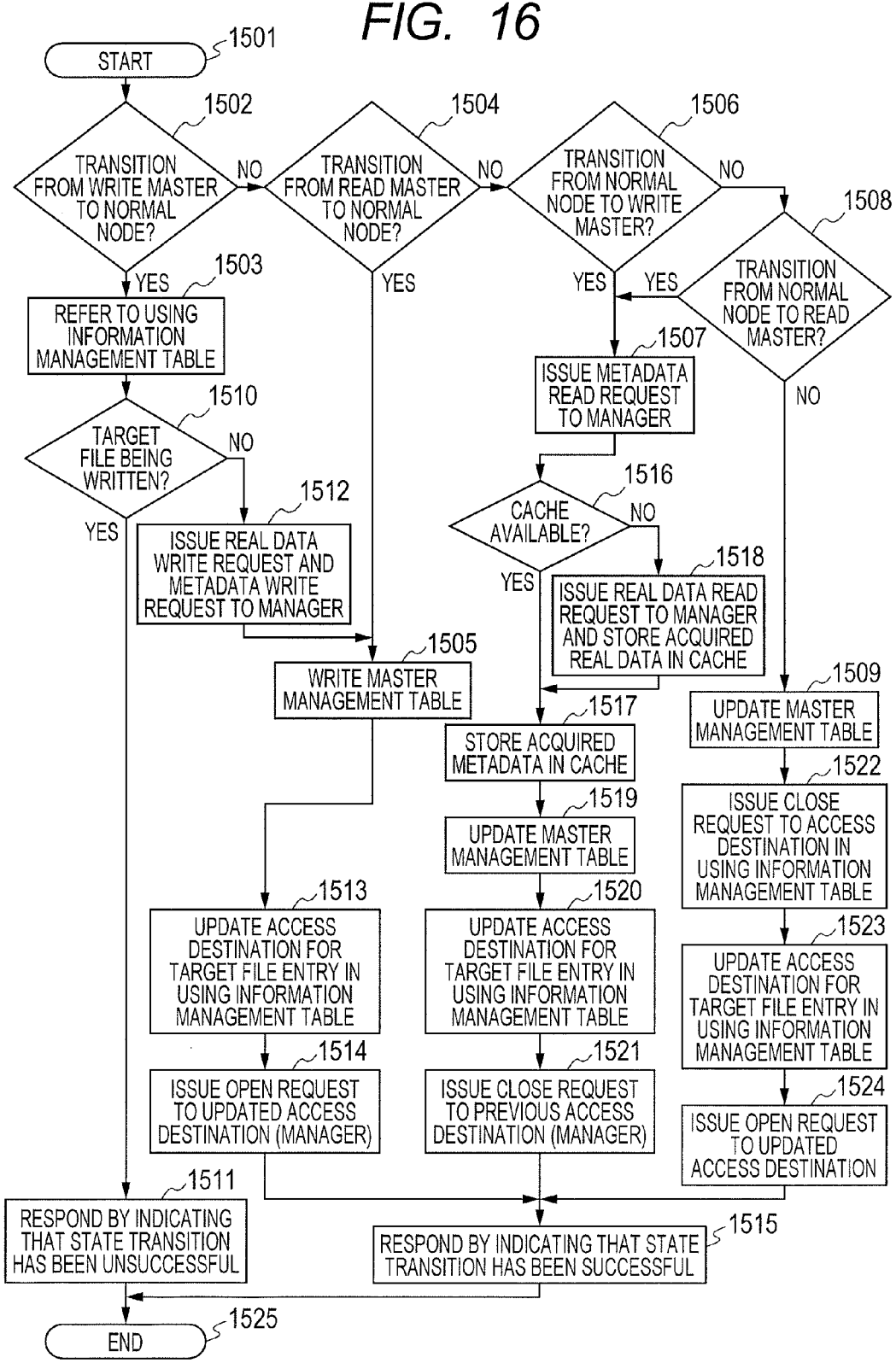
FIG. 16 is a flowchart illustrating a response-to-manager process performed by the node apparatuses according to the first embodiment of the present invention.

FIG. 16 is a flowchart illustrating the response-to-manager process (step 805 shown in FIG. 9) that is performed by the node control unit 120. First of all, the node control unit 120 proceeds from a start state 1501 to step 1502. In steps 1502, 1504, 1506, and 1508, the node control unit 120 identifies the aforementioned five different transition instructions in accordance with the present state of the local node, which is indicated by the information in the master management table 122 read in step 804, and with the state transition request from the manager control unit 115.

In step 1502, the node control unit 120 judges whether the instruction received from the manager control unit 115 specifies the transition from the write master 303 to the normal node 302. If the result of judgment is true, the node control unit 120 proceeds to step 1503. If the result is false, the node control unit 120 proceeds to step 1504.

In step 1504, the node control unit 120 judges whether the instruction received from the manager control unit 115 specifies the transition from the read master 301 to the normal node 302. If the result of judgment is true, the node control unit 120 proceeds to step 1505. If the result is false, the node control unit 120 proceeds to step 1506.

In step 1506, the node control unit 120 judges whether the instruction received from the manager control unit 115 specifies the transition from the normal node 302 to the write master 303. If the result of judgment is true, the node control unit 120 proceeds to step 1507. If the result is false, the node control unit 120 proceeds to step 1508.

In step 1508, the node control unit 120 judges whether the instruction received from the manager control unit 115 specifies the transition from the normal node 302 to the read master 301. If the result of judgment is true, the node control unit 120 proceeds to step 1507. If the result is false, the node control unit 120 proceeds to step 1509. Step 1509 involves an instruction for transition to the same state and is performed when a master management table update request is issued.

In step 1503, the node control unit 120 reads the using information management table 123 for a target file, and then proceeds to step 1510. In step 1510, the node control unit 120 judges in accordance with step 1501 whether the target file is being written. If the result of judgment is true, the node control unit 120 proceeds to step 1511. If the result is false, the node control unit 120 proceeds to step 1512. More specifically, the result is true if the using information management table 123 contains an entry that has the same file path 501 as the target file and the value "WRITE" in the field of the type 502, or false if the using information management table 123 contains no such entry.

In step 1511, the node control unit 120 cannot effect a state change relative to the target file because the target file is being written; therefore, the node control unit responds to the manager control unit 115 by indicating that the specified state transition has been unsuccessful, and then proceeds to an end state 1525.

In step 1512, on the other hand, the state of the node relative to the target file can be changed; therefore, the node control unit 120 accesses the manager control unit 115, issues a real data write request and a metadata write request in accordance with the real data and metadata stored in the cache area 124, and then proceeds to step 1505.

In step 1505, the node control unit 120 writes the master management table 122 in accordance with the instruction from the manager control unit 115, and then proceeds to step 1513. More specifically, the node control unit 120 deletes the description of the local node from the field of the master 403 in the master management table 122 so that the local node functions as the normal node relative to the target file.

In step 1513, the node control unit 120 updates the access destination 505 for a target entry in the using information management table 123, and then proceeds to step 1514. More specifically, the access destination 505 for an entry whose file path 501 indicated in the using information management table 123 corresponds to the target file is changed from the local node to the manager control unit 115 of the manager apparatus 101 because the instruction specifies the transition to the normal node 302.

In step 1514, the node control unit 120 accesses the manager control unit 115, which is the access destination 505 newly selected in step 1513, issues an open request concerning the target file, and then proceeds to step 1515.

Meanwhile, in step 1507 in which the instruction for transition from the normal node to the write master or read master is received, the node control unit 120 accesses the manager control unit 115, issues a metadata read request, and then proceeds to step 1516.

In step 1516, the node control unit 120 uses the metadata acquired in step 1507 to judge whether real data in the cache area 124 managed by the cache control unit 121 is available. If the result of judgment is true, the node control unit 120 proceeds to step 1517. If the result is false, the node control unit 120 proceeds to step 1518. The result of judgment in step 1516 is found to be true if the cache area 124 stores real data and the metadata acquired in step 1507 agrees with the metadata stored in the cache area 124. In this instance, the processing time required for checking for metadata agreement may be reduced by comparing some portion of the metadata such as write time and file size.

In step 1518, the node control unit 120 accesses the manager control unit 115, issues a real data read request to acquire real data, stores the acquired real data in the cache area 124, and then proceeds to step 1517. In step 1517, the node control unit 120 stores the metadata acquired in step 1507 in the cache area 124, and then proceeds to step 1519.

In step 1519, the node control unit 120 updates the master management table 122 in accordance with the instruction from the manager control unit 115, and then proceeds to step 1520. In other words, the node control unit 120 stores a local node identifier in the field of the master 403 in the master management table 122 that relates to the target file.

In step 1520, the node control unit 120 updates the access destination 505 for the target entry in the using information management table 123, and then proceeds to step 1521. More specifically, the access destination 505 for an entry whose file path 501 indicated in the using information management table 123 corresponds to the target file is changed to the cache area 124 of the local node because the instruction specifies the transition to a master. In step 1521, the node control unit 120 issues a close request concerning the target file to the manager control unit 115, which was the access destination 505 before the change in step 1520, and then proceeds to step 1515.

Meanwhile, in step 1509, which involves an instruction for transition to the same state, the node control unit 120 writes the master management table 122 in accordance with the instruction from the manager control unit 115, and then proceeds to step 1522. In step 1522, the node control unit 120 reads the using information management table 123, issues a close request concerning the target file to the access destination 505 for the target entry, and then proceeds to step 1523. More specifically, if the access destination 505 for an entry whose file path 501 indicated in the using information management table 123 corresponds to the target file is not the cache area 124, the node control unit 120 accesses the access destination 505 and issues a close request concerning the target file.

In step 1523, the node control unit 120 changes the access destination 505 for the aforementioned target entry in the using information management table 123 in accordance with the master management table 122 specified by the manager control unit 115, and then proceeds to step 1524.

In step 1524, the node control unit 120 issues an open request concerning the target file to the access destination 505 that was changed in step 1523, and then proceeds to step 1515.

In step 1515, the node control unit 120 responds to the manager control unit 115 of the requester by indicating that the specified state transition has been successful, and then proceeds to the end state 1525.

By performing the above processing steps, the node control unit 120 responds to a request from the user, another program, the manager control unit 115, or another node control unit 120. It should be noted that all processing steps indicated in FIGS. 9 to 16 are performed by the node control unit 120.

Manager Operations

Operations of the manager control unit 115 will now be described. The manager control unit 115 receives a request from the node control unit 120 and responds to the request. In the present embodiment, requests from the node control unit 120 include a master information request, a communication information conveyance, and a file access request. Processes performed by the manager control unit 115 in response to such requests will be described below with reference to flowcharts.

Figure 17:
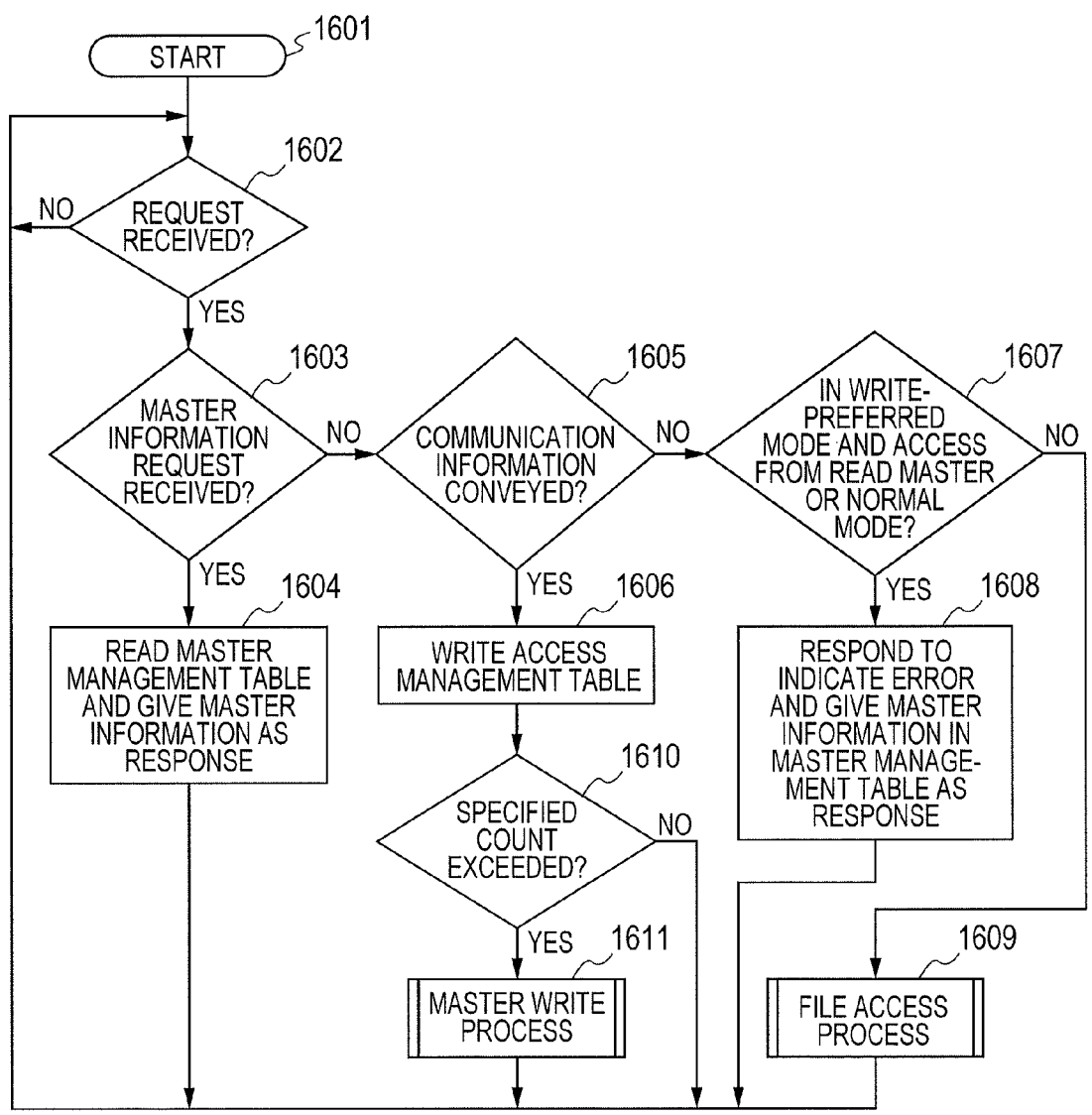
FIG. 17 is a flowchart illustrating processes performed by the manager apparatus according to the first embodiment of the present invention.

FIG. 17 is a flowchart illustrating the processes performed by the manager control unit 115. When the manager apparatus 101 executes the manager control unit 115, the manager control unit 115 proceeds from a start state 1601 to step 1602.

In step 1602, the manager control unit 115 judges whether a request is received from the node control unit 120. If the result of judgment is true, the manager control unit 115 proceeds to step 1603. If the result is false, the manager control unit 115 proceeds to step 1602. Processes in step 1602 may be performed in a parallel manner by using, for instance, a scheme of multi-threading or multi-processing by the CPU 105 to improve response to an access request.

In step 1603, the manager control unit 115 analyzes the request received in step 1602 and judges whether it is a master information request. If the result of judgment is true, the manager control unit 115 proceeds to step 1604. If the result is false, the manager control unit 115 proceeds to step 1605.

The node apparatuses 102, 103 issue a master information request in step 1010, which is shown in FIG. 11.

In step 1604, the manager control unit 115 reads the master management table 117, which is managed by the manager control unit 115, returns the contents of the master management table 117 to the node control unit 120 as master information, and then proceeds to step 1602.

In step 1605, the manager control unit 115 analyzes the request received in step 1602 and judges whether it is a communication information conveyance. If the result of judgment is true, the manager control unit 115 proceeds to step 1606. If the result is false, the manager control unit 115 proceeds to step 1607. The communication information conveyance takes place in step 1408, which is shown in FIG. 15.

In step 1606, the manager control unit 115 adds the contents of the communication information conveyance, which are received in step 1602, to the access management table 119, which was described with reference to FIG. 7, and then proceeds to step 1610. More specifically, the manager control unit 115 sets the name of the requesting node control unit 120 in the field of the node name 601, sets the conveyed information contained in the using information management table 123 for the node control unit 120 in respective fields, namely, the access destination 505 in the field of the access destination 602, the acquisition time 509 in the field of the time 603, the transfer size 506 in the field of the transfer size 604, the transfer time 507 in the field of the transfer time 603, the transfer size 506 in the field of the transfer size 604, the transfer time 507 in the field of the transfer time 605, and the type 502 in the field of the transfer direction 606, sets the round-trip time conveyed from the node control unit 120 in the field of the round-trip time 607, creates an entry having the above-described fields, and adds the created entry to the access management table 119.

In step 1610, the manager control unit 115 judges whether a specified count is exceeded by the number of executions of step 1610. If the result of judgment is true, the manager control unit 115 proceeds to step 1611. If the result is false, the manager control unit 115 proceeds to step 1602. The specified count is a value preset in the manager control unit 115. The specified count may be set, for instance, by giving an argument when the manager control unit 115 starts up, by allowing the manager control unit 115 to read a setting written in a setup file, by establishing communication to let the manager control unit 114 receive an instruction from the outside, or by allowing the user to enter a setting. Obviously, however, the specified count may be set in any other manner. These settings can be generally defined by a program that is based on a publicly known or well-known technology. In the present embodiment, the judgment in step 1610 is made on the basis of the specified count. Alternatively, however, the judgment may be made on the basis, for instance, of a preselected numeral value such as the length of elapsed time, the number of entries in the access management table 119, or the sum of the values in the field of the transfer size 604 in the access management table 119. Another alternative is to employ a specified count of 0 to let the manager control unit 115 proceed to step 1611 each time.

In step 1611, the manager control unit 115 performs a master update process and then proceeds to step 1602. The master update process will be described later.

In step 1607, the manager control unit 115 reads the master management table 117, and judges whether the computer system is in the write-preferred mode 202 relative to a file designated by the request received in step 1602 (this file is hereinafter referred to as the target file) and the request-receiving node control unit 120 does not serve as a write master (that is, serve as a read master or a normal node). If the result of judgment is true, the manager control unit 115 proceeds to step 1608. If the result is false, the manager control unit 115 proceeds to step 1609. More specifically, the manager control unit 115 judges whether the value in the field of the master 403 of an entry whose file path 401 in the master management table 117 corresponds to the target file is in agreement with the node control unit 120 that has received the request.

In step 1608, the manager control unit 115 notifies the node control unit 120 of an error because the computer system is in the write-preferred mode relative to the target file and the request-receiving node control unit 120 is not a write master. Further, the manager control unit 115 gives the contents of the master management table 117 to the node control unit 120 as a response for master management table update purposes, and then proceeds to step 1602. The process of the node control unit 120 that corresponds to the response for master management table update in step 1608 is step 1008, which is shown in FIG. 11.

In step 1609, the manager control unit 115 performs a file access process as the access is gained from a write master. After completion of step 1609, the manager control unit 115 proceeds to step 1602. This file access process is performed by the manager control unit 115 and different from the file access performed by the node control unit 120, which was described with reference to FIG. 10. The file access process performed by the manager control unit 115 will be described later. The method of receiving and analyzing a request and the method of identifying a requesting node control unit 120 are not described here because they can be generally implemented, for instance, by a server program that is based on a publicly known or well-known technology.

In the master update process, which is performed in step 1611, the manager control unit 115 determines the mode, which is described with reference to FIG. 2, for each file stored in the storage control unit 116, and causes each node control unit 120 to transition to one of the states described with reference to FIG. 3 in accordance with the determination.

The master update process, which is performed in step 1611 shown in FIG. 17, will now be described in detail with reference to a flowchart.

Figure 18:
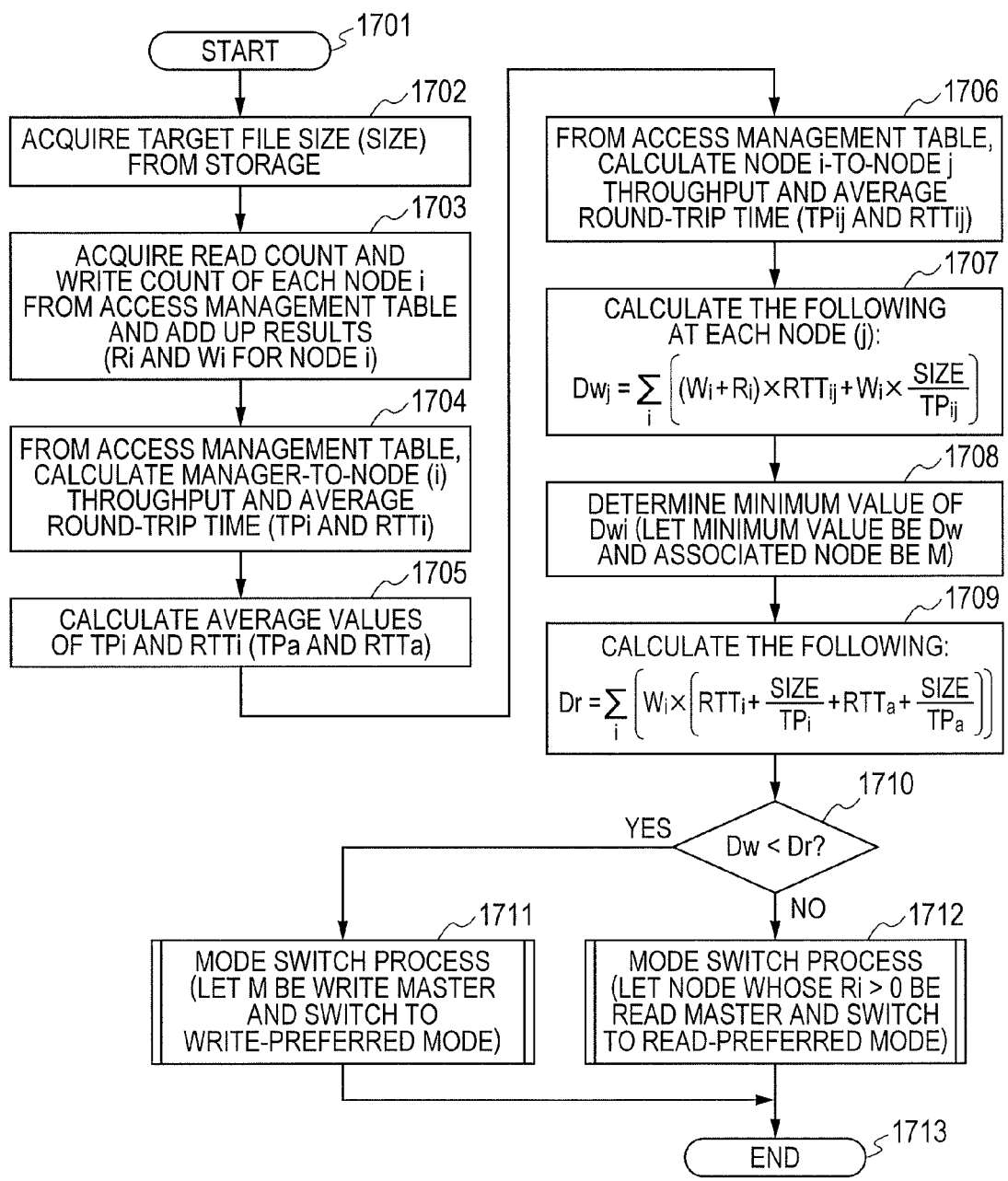
FIG. 18 is a flowchart illustrating a master update process performed by the manager apparatus according to the first embodiment of the present invention.

FIG. 18 is a flowchart illustrating the master update process (step 1611) that is performed by the manager control unit 115. Variables described below are stored in the storage apparatus 106. The method of storing the variables is not described here because it can be implemented by using a publicly known or well-known technology.

First of all, the manager control unit 115 proceeds from a start state 1701 to step 1702. In step 1702, the manager control unit 115 acquires the size of a target file from the storage control unit 116, stores it in a variable SIZE, and then proceeds to step 1703.

In step 1703, the manager control unit 115 reads the access management table 119 for the target file, acquires the target file read count and write count in each node control unit 120, adds up the acquired counts, and then proceeds to step 1704. More specifically, the number of entries that include the target file in the field of the access destination 602 of the access management table 119, relate to the node control unit 120 having a node name 601 of i, and have a transfer direction 606 of READ is determined and regarded as the read count. The read count is also determined in the same manner. The results of additions of the read count and write count of each node control unit 120 having a node name of i are then respectively stored in variables Ri, Wi. The method of using a sign (e.g., i) to handle multiple targets is not described in detail here because it is generally known as a summation of numerical sequences in mathematics or an array in a program and can be implemented by using a publicly known or well-known technology. The same holds for cases where multiple signs (e.g., i and j) are used. Consequently, the expression such as "the read count and write count of each node control unit i 120 are respectively stored in the variables Ri, Wi" will be hereinafter used without further explanation.

In step 1704, the manager control unit 115 reads the access management table 119 for the target file, calculates the average throughput and average round-trip time from the manager control unit 115 to the node control unit i 120, stores the calculated values in variables TPi, RTTi, respectively, and then proceeds to step 1705. More specifically, as regards entries that relate to the target file having an access destination 601 of the manager control unit 115 as indicated in the access management table 119 and have a node name 601 of i, the value obtained by dividing the sum of values in the field of the transfer size 604 by the sum of values in the field of the transfer time 605 is stored in the variable TPi, whereas the value obtained by dividing the sum of values in the field of the round-trip time 607 by the number of entries is stored in the variable RTTi. If the divisor is 0 (zero), the result is 0 (zero). If the variable TPi is 0 (zero), the maximum band frequency available in the network is stored in the variable TPi as a tentative value. The throughput indicates the time required for communication (communication time) and is expressed by a value (e.g., in bytes/sec) that is obtained by dividing the size (SIZE) of data by the data transfer time 605. The round-trip time 607 is determined as the time required for response, which is obtained, for instance, by subtracting the data transfer time 605 from the communication time. The throughput and round-trip time 607 (RTT) are generally used in a communication program and can be defined by using a publicly known or well-known technology.

In step 1705, the manager control unit 115 calculates the average values of the variables TPi, RTTi in all the node control units 120i, stores the calculated average values in variables TPa, RTTa, respectively, and then proceeds to step 1706.

In step 1706, the manager control unit 115 reads the access management table 119 for the target file, calculates the average throughput and average round-trip time from a node control unit i 120 to a node control unit j 120, stores the calculated values in variables TPij, RTTij, respectively, and then proceeds to step 1707. More specifically, as regards entries that relate to the target file for the manager control unit 115 having a node name 601 of i in the access management table 119 and having an access destination 602 of j, the value obtained by dividing the sum of values in the field of the transfer size 604 by the sum of values in the field of the transfer time 605 is stored in the variable TPij, whereas the value obtained by dividing the sum of values in the field of the round-trip time 607 by the number of entries is stored in the variable RTTij. However, if there are no related entries or if the variable TPij is 0 (zero), the value TPi is stored in the variable TPij and the value RTTi is stored in the variable RTTij. If the value i is the same as the value j, a great value (e.g., a value several times greater than the other average values of TPij) is stored in the variable TPij and the value 0 (zero) is stored in the variable RTTij.

In step 1707, the manager control unit 115 calculates (Wi+Ri)×RTTij+Wi×SIZE/TPij of the node control unit j 120, determines the sum of resultant values of all node control units 120i, stores the sum in a variable Dwj, and then proceeds to step 1708.

In step 1708, the manager control unit 115 determines the minimum value of Dwi of all node control units 120 (*i*), stores the minimum value i a variable Dw, regards the associated node control unit 120 as M, and then proceeds to step 1709. In step 1709, the manager control unit 115 calculates Wi× (RTTi+SIZE/TPi+RTTa+SIZE/TPa) of the node control unit i 120, determines the sum of resultant values of all node control units 120 (*i*), stores the sum in a variable Dr, and then proceeds to step 1710.

In step 1710, the manager control unit 115 judges whether the variable Dw is smaller than the variable Dr. If the result of judgment is true, the manager control unit 115 proceeds to step 1711. If the result is false, the manager control unit 115 proceeds to step 1712.

In step 1711, the manager control unit 115 performs a mode switch process in such a manner that the write-preferred mode 202 is selected for the target file while the node control unit M 120 serves as the write master 303 with the other node control unit 120 serving as the normal node 302. Upon completion of the mode switch process, the manager control unit 115 proceeds to an end state 1713.

In step 1712, the manager control unit 115 performs the mode switch process in such a manner that the read-preferred mode 201 is selected for the target file while the node control unit i 120 whose Ri value is greater than 0 (zero) serves as the read master 301 with the other node control unit 120 serving as the normal node 302. Upon completion of the mode switch process, the manager control unit 115 proceeds to the end state 1713. The mode switch process performed in steps 1711 and 1712 will be described later.

The variable Dwj calculated in step 1707 by the manager control unit 115 is a roughly estimated value representing the total file access time that is required when the node control unit j 120 is a write master in the write-preferred mode 202. The variable Dr, on the other hand, is a roughly estimated value representing the total file access time that is required in the read-preferred mode 201. An estimate made in step 1710 indicates whether a relatively fast file access process is performed in the write-preferred mode 202 or in the read-preferred mode 201. The master update process described with reference to FIG. 18 selects a mode and a master that are estimated to provide the fastest file access.

An alternative is to compare the average time required for transfer from the manager control unit 115 to the node control unit 120 (first access time) against the average time required for transfer from the node control unit 120 to the other node control unit 120 (second access time) when the target file is accessed in the same manner as indicated in an access history, and select the write-preferred mode if the first access time is shorter than the second access time or select the read-preferred mode if the second access time is shorter than the first access time.

The present invention is not limited to the use of the master update process described with reference to FIG. 18. The present invention is also applicable to a case where the master update process selects an appropriate combination of a mode and a master in accordance with a certain standard. For example, the processing time required for the master update process may be reduced by employing a mode selection standard that selects the read-preferred mode 201 and allows all node control units 120 to serve as a read master 301 when the target file write count is 0 (zero) or selects the write-preferred mode 202 and allows the node control unit 120 having the greatest access count to serve as a write master when the target file write count is greater than 0 (zero).

All entries in the access management table 119, which is used in steps 1703, 1704, and 1706, need not always be handled as targets. An alternative is to decrease the number of entries to be handled to reduce the processing time required for the master update process or lessen the influence of old entries to increase the accuracy of estimation, for instance, by handling some particular entries whose value in the field of the time 603 is not more than one hour old. Another alternative is to reduce the influence of old entries for an increase in the accuracy of estimation by ensuring that the older the entries in the access management table 119, the smaller their values.

The above-described master update process selects a mode (read-preferred mode or write-preferred mode) and a master (read master or write master) for the node control unit 120 of each node apparatus that are estimated to provide the fastest file access from in consideration of the target file read count and write count, average throughput, average round-trip time, and data transfer direction. If the node control unit 120 of a node apparatus is not selected as the read master or as the write master, it becomes a normal node.

The mode switch process, which is performed in steps 1711 and 1712, specifies the mode and master for the target file, selects either of the computer system modes described with reference to FIG. 2, and causes each node control unit 120 to transit to either of the states described with reference to FIG. 3.

Figure 19:
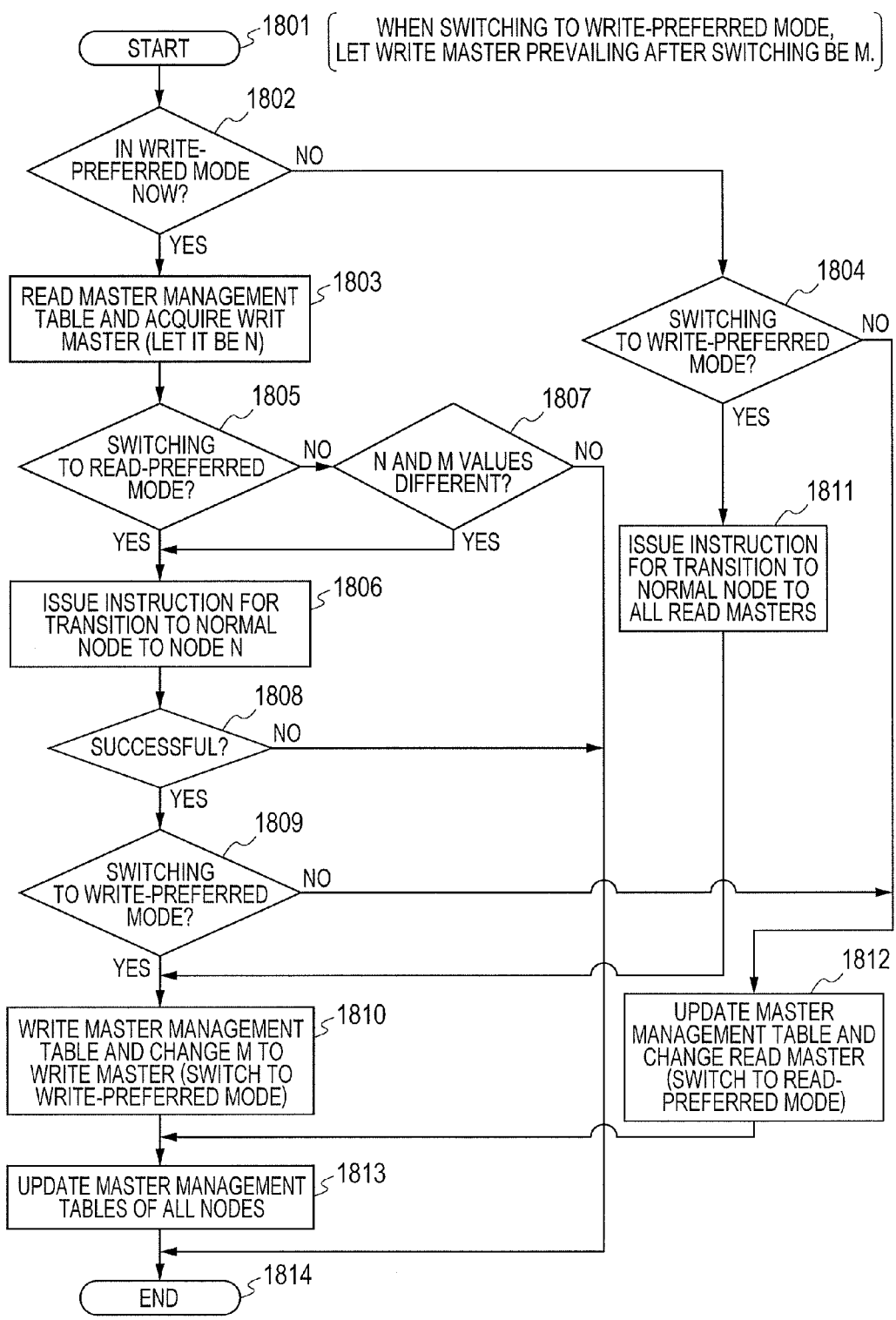
FIG. 19 is a flowchart illustrating a mode switch process performed by the manager apparatus according to the first embodiment of the present invention.

The mode switch process will now be described with reference to a flowchart. FIG. 19 is a flowchart illustrating the mode switch process that is performed by the manager control unit 115. The flowchart of FIG. 19 shows the details of the process performed in step 1711 or 1712 in FIG. 18.

When designated as the write master 303 in a situation where the mode switch process is performed to select the write-preferred mode 202, the node control unit 120 is referred to as the M in the subsequent description. First of all, the manager control unit 115 proceeds from a start state 1801 to step 1802. In step 1802, the manager control unit 115 reads the master management table 117 for a target file, and judges whether the target file is currently in the write-preferred mode 202. If the result of judgment is true, the manager control unit 115 proceeds to step 1803. If the result is false, the manager control unit 115 proceeds to step 1804. More specifically, the manager control unit 115 reads the master management table 117, searches for an entry having a file path 401 corresponding to the target file, and reads the access mode 402 of the entry for judgment purposes.

In step 1803, the manager control unit 115 reads the master management table 117 to determine which node control unit 120 is the write master 303, and then proceeds to step 1805. More specifically, the manager control unit 115 reads the master 403 for the entry that was searched for in step 1802. In the subsequent description, the acquired write master 303 is referred to as the N.

In step 1805, the manager control unit 115 judges whether the instruction determined as depicted in FIG. 18 specifies a change to the read-preferred mode 201. If the result of judgment is true, the manager control unit 115 proceeds to step 1806. If the result is false, the manager control unit 115 proceeds to step 1807.

In step 1807, the manager control unit 115 judges whether the value of the N is different from the value of the M. If the result of judgment is true, the manager control unit 115 proceeds to step 1806. If the result is false, the manager control unit 115 proceeds to an end state 1814.

In step 1806, the manager control unit 115 instructs the node control unit 120 serving as the N to transition from the write master 303 to the normal node 302, and then proceeds to step 1808.

In step 1808, the manager control unit 115 judges whether the result of step 1806 is successful. If the result of judgment is true, the manager control unit 115 proceeds to step 1809. If the result is false, the manager control unit 115 proceeds to the end state 1814. This judgment is made by the manager control unit 115 in accordance with a response from the node control unit 120.

In step 1809, the manager control unit 115 judges whether the instruction determined as depicted in FIG. 18 specifies a change to the write-preferred mode 202. If the result of judgment is true, the manager control unit 115 proceeds to step 1810. If the result is false, the manager control unit 115 proceeds to step 1812.

In step 1804, the manager control unit 115 judges whether the instruction determined as depicted in FIG. 18 specifies a change to the write-preferred mode 202. If the result of judgment is true, the manager control unit 115 proceeds to step 1811. If the result is false, the manager control unit 115 proceeds to step 1812.

In step 1811, the manager control unit 115 reads the master management table 117 for the target file, instructs the node control unit 120 serving as the read master 301 to transition from the read master 301 to the normal node 302, and then proceeds to step 1810. The node control unit 120 serving as the read master 301 is identified by referencing the master management table 117 to search for an entry having a file path 401 corresponding to the target file and referencing the entry's master 403.

In step 1810, the manager control unit 115 writes the master management table 117 with respect to the target file, selects the write-preferred mode 202 as the access mode for the target file, designates the node control unit 120 serving as the M as the write master 303, and then proceeds to step 1813. More specifically, the manager control unit 115 searches the master management table 117 for an entry having a file path 401 corresponding to the target file. If no such entry exists, the manager control unit 115 creates a new one. The manager control unit 115 then selects the write-preferred mode as the access mode 402 for the entry and designates the node control unit 120 serving as the M as the master 403.

In step 1812, the manager control unit 115 writes the master management table 117 with respect to the target file, selects the read-preferred mode 201 as the access mode for the target file, designates the specified node control unit 120 as the read master 301, and then proceeds to step 1813. More specifically, the manager control unit 115 searches the master management table 117 for an entry having a file path 401 corresponding to the target file. If no such entry exists, the manager control unit 115 creates a new one. The manager control unit 115 then selects the read-preferred mode as the access mode 402 for the entry and designates the specified node control unit 120 (or specified multiple node control units) as the master 403.

In step 1813, the manager control unit 115 issues a master management table update request by notifying all node control units 120 of the contents of the master management table 117, and then proceeds to the end state 1814. The process performed in response to the master management table update request in step 1813 is performed in step 1509, which is shown in FIG. 16.

The processes depicted in FIGS. 18 and 19 make it possible to select either the read-preferred mode or the write-preferred mode for each file in accordance with the history of read and write accesses and give metadata management authority to the node control units 120 of the node apparatuses 102, 103. When a file is read frequently, the authority to store and read the metadata (read master) is given to each node apparatus, and the read-preferred mode is used because it permits high-speed reading although it requires a certain amount of time to perform writing. When, on the other hand, a single node apparatus performs writing frequently, the authority to store and write the metadata (write master) is given to the node apparatus, and the write-preferred mode is used because it permits the node apparatus to perform a high-speed write by itself. The manager apparatus 101 performs calculations on the time required for access to select either the read-preferred mode or the write-preferred mode for each file in accordance with the access history, and switches between the two modes to provide high-speed file access.

As shown in FIGS. 3 and 4, the node apparatuses 102, 103 are a node apparatus that is given the read master authority in the read-preferred mode, a node apparatus that is given the write master authority in the write-preferred mode, or another node apparatus that serves as a normal node.

The file access process performed by the manager control unit 115 in step 1609, which is shown in FIG. 17, is similar to the file access process performed in step 807 by the node control unit 120 in that they both respond to a file access request. The description of the types of file access requests and the overall information about file access requests including the FID are omitted here because the file access requests have been described in connection with the file access process in step 807. However, the description of a file access request to the other node control unit 120 and manager control unit 115, which is given in connection with step 807, does not apply to the file access process performed in step 1609, which is shown in FIG. 17. If multiple requests are issued at a time in the file access process in step 1609, they are sequentially processed by the manager control unit 115 instead of the node control unit 120.

The file access process performed by the manager control unit 115 in response to six different file access requests will now be described with reference to a flowchart.

Figure 20:
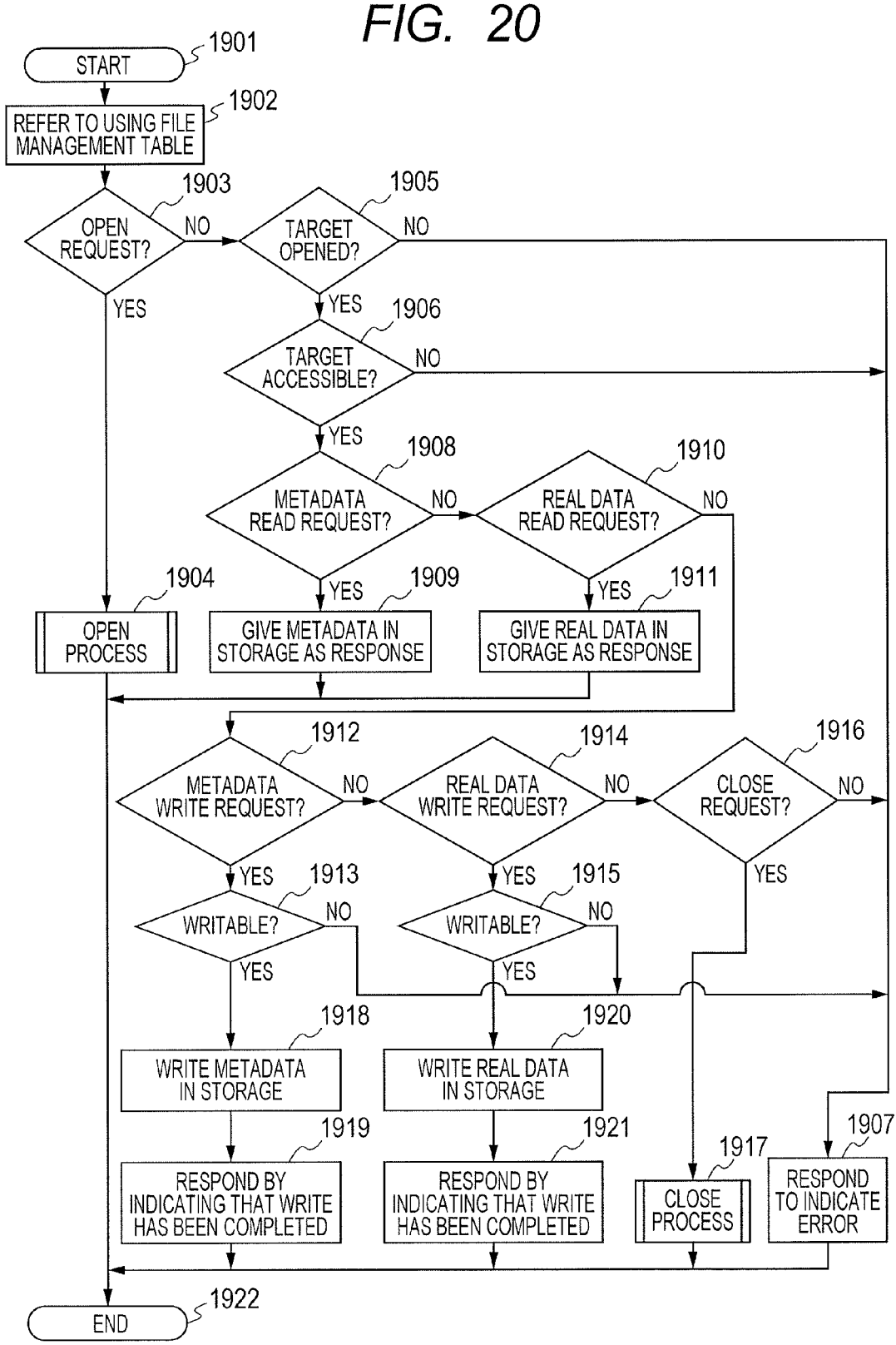
FIG. 20 is a flowchart illustrating a file access process performed by the manager apparatus according to the first embodiment of the present invention.

FIG. 20 is a flowchart illustrating the file access process (step 1609 shown in FIG. 17) performed by the manager control unit 115.

First of all, the manager control unit 115 proceeds from a start state 1901 to step 1902. In step 1902, the manager control unit 115 reads the using file management table 118 for a target file, and then proceeds to step 1903. In step 1903, the manager control unit 115 judges whether the request concerning the target file is an open request. If the result of judgment is true, the manager control unit 115 proceeds to step 1904. If the result is false, the manager control unit 115 proceeds to step 1905.

In step 1904, the manager control unit 115 performs an open process on the target file, and then proceeds to an end state 1922. The open process performed by the manager control unit 115 will be described later.

In step 1905, the manager control unit 115 uses the using file management table 118, which was read in step 1902, to judge whether the open process is already performed on the target file in step 1904. If the result of judgment is true, the manager control unit 115 proceeds to 1906. If the result is false, the manager control unit 115 proceeds to step 1907. More specifically, if the ID 703 of any entry in the using file management table 118 has the same value as the FID attached to a file access request, the manager control unit 115 concludes that the result of judgment is true. If there is no such entry, the manager control unit 115 concludes that the result is false.

In step 1906, the manager control unit 115 judges whether the target file is accessible. If the result of judgment is true, the manager control unit 115 proceeds to step 1908. If the result is false, the manager control unit 115 proceeds to step 1907. More specifically, the manager control unit 115 reads the metadata stored by the storage control unit 116 to judge whether the access of a user and the node control unit 120 is granted, a write request or other illegal request is received for read access, and the target file is accessible from the viewpoint, for instance, of locked state, permission, and access authority.

In step 1908, the manager control unit 115 judges whether the access request concerning the target file is a metadata read request. If the result of judgment is true, the manager control unit 115 proceeds to step 1909. If the result is false, the manager control unit 115 proceeds to step 1910.

In step 1909, the manager control unit 115 gives the metadata in the storage control unit 116 to a requesting node control unit 120 as a response, and then proceeds to the end state 1922.

In step 1910, the manager control unit 115 judges whether the access request is a real data read request. If the result of judgment is true, the manager control unit 115 proceeds to step 1911. If the result is false, the manager control unit 115 proceeds to step 1912.

In step 1911, the manager control unit 115 gives the real data in the storage control unit 116 to the requesting node control unit 120 as a response, and then proceeds to the end state 1922.

In step 1912, the manager control unit 115 judges whether the access request is a metadata write request. If the result of judgment is true, the manager control unit 115 proceeds to step 1913. If the result is false, the manager control unit 115 proceeds to step 1914.

In step 1914, the manager control unit 115 judges whether the access request is a real data write request. If the result of judgment is true, the manager control unit 115 proceeds to step 1915. If the result is false, the manager control unit 115 proceeds to step 1916.

In step 1916, the manager control unit 115 judges whether the access request is a close request. If the result of judgment is true, the manager control unit 115 proceeds to step 1917. If the result is false, the manager control unit 115 proceeds to step 1907.

In step 1917, the manager control unit 115 performs a close process on the target file, and then proceeds to the end state 1922. The close process performed by the manager control unit 115 will be described later.

In step 1907, the manager control unit 115 returns an error to the requesting node control unit 120 because the result of judgment is found to be false in step 1905, 1906, 1913, 1915, or 1916, and then proceeds to the end state 1922.

In step 1913, the manager control unit 115 judges whether the metadata in the target file is not accessed by the other node control unit 120 and is writable. If the result of judgment is true, the manager control unit 115 proceeds to step 1918. If the result is false, the manager control unit 115 proceeds to step 1907.

In step 1915, the manager control unit 115 judges whether the target file is not accessed by the other node control unit 120 and is writable. If the result of judgment is true, the manager control unit 115 proceeds to step 1920. If the result is false, the manager control unit 115 proceeds to step 1907. More specifically, in steps 1913 and 1915, the manager control unit 115 reads the using file management table 118. If an entry having a file path 701 corresponding to the target file does not have an ID 703 that differs from the FID attached to the file access request, the manager control unit 115 concludes that the result of judgment is true. If, on the other hand, an entry having the file path 701 corresponding to the target file has an ID 703 that differs from the FID attached to the file access request, the manager control unit 115 concludes that the result of judgment is false.

In step 1918, the manager control unit 115 writes the metadata in the target file managed by the storage control unit 116 in accordance with the metadata write request, and then proceeds to step 1919.

In step 1919, the manager control unit 115 responds to the requesting node control unit 120, which issued the metadata write request, by indicating the write has been completed, and then proceeds to the end state 1922.

In step 1920, the manager control unit 115 writes the real data in the target file managed by the storage control unit 116 in accordance with the real data write request, and then proceeds to step 1921. In step 1921, the manager control unit 115 responds to the requesting node control unit 120, which issued the real data write request, by indicating the write has been completed, and then proceeds to the end state 1922.

The open process (step 1904 shown in FIG. 20) performed by the manager control unit 115 opens a file and writes the using file management table 118 to create a state where a file access request other than an open request can be processed.

Figure 21:
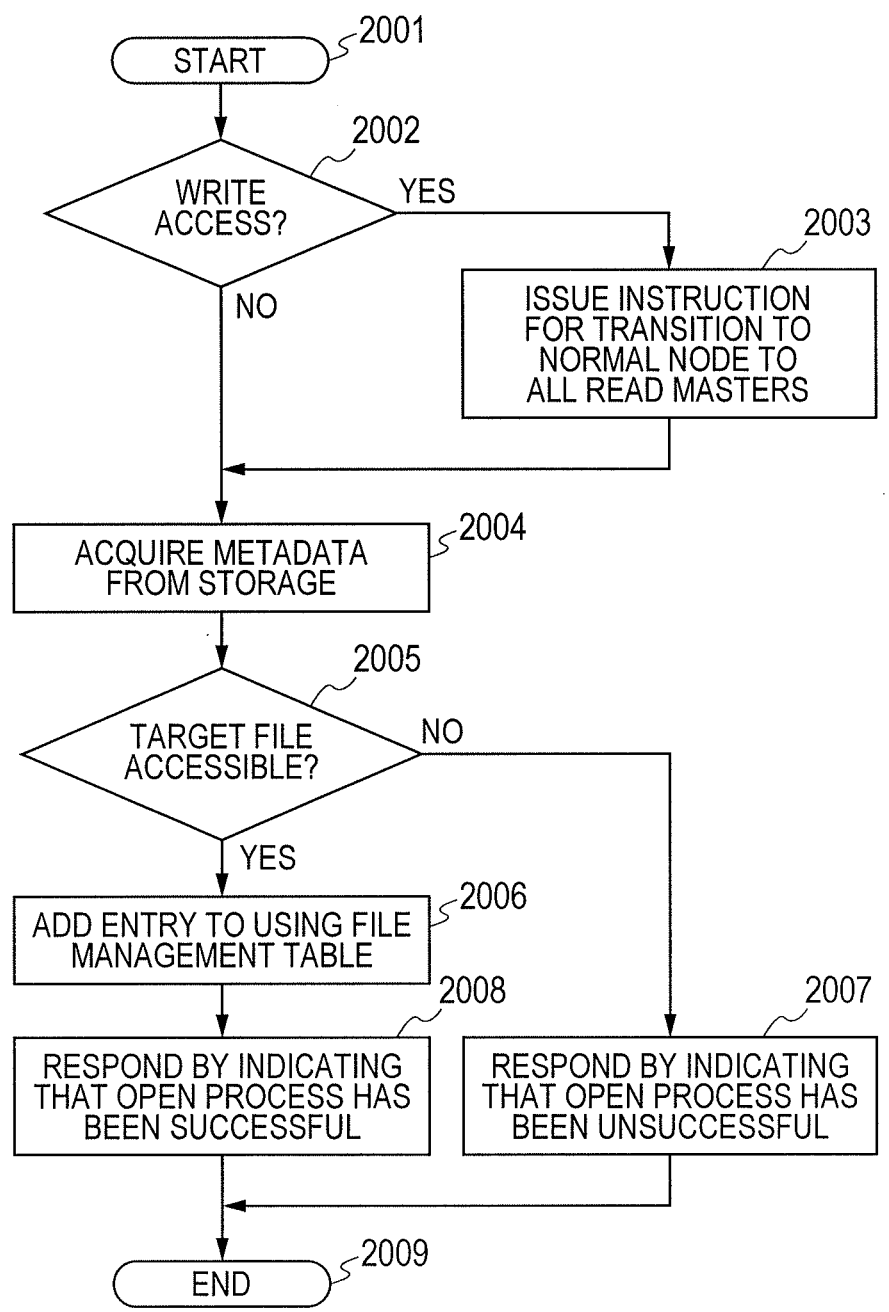
FIG. 21 is a flowchart illustrating an open process performed by the manager apparatus according to the first embodiment of the present invention.

FIG. 21 is a flowchart illustrating the open process that is performed by the manager control unit 115. First of all, the manager control unit 115 proceeds from a start state 2001 to step 2002. In step 2002, the manager control unit 115 judges whether a received access request is a request for write access. If the result of judgment is true, the manager control unit 115 proceeds to step 2003. If the result is false, the manager control unit 115 proceeds to step 2004.

In step 2003, the manager control unit 115 reads the master management table 117 for a target file. If a node control unit 120 serving as a read master 301 is found, the manager control unit 115 instructs the node control unit 120 to transition from the read master 301 to a normal node 302, and then proceeds to step 2004. The node control unit 120 serving as the read master 301 is identified by referencing the master management table 117 to search for an entry having a file path 401 corresponding to the target file and referencing the entry s master 403 when the access mode 402 is the read-preferred mode.

In step 2004, the manager control unit 115 acquires the metadata in the target file from the storage control unit 116, and then proceeds to step 2005.

In step 2005, the manager control unit 115 uses the metadata acquired in step 2004 to judge whether the target file is accessible. If the result of judgment is true, the manager control unit 115 proceeds to step 2006. If the result is false, the manager control unit 115 proceeds to step 2007. The judgment method used in step 2005 is not described in detail here because it is the same as the method used in step 1906, which is shown in FIG. 20.

In step 2006, the manager control unit 115 creates an entry in the using file management table 118, and then proceeds to step 2008. In step 2006, the entry is created by setting the path of the target file in the field of the file path 701, setting either read access or write access in the field of the type 702, setting an appropriate serial number or other value different from the IDs of the other entries in the field of the ID 703, setting the name of a user who has gained access in the field of the user name 704, and setting an access destination from which the metadata is acquired in the field of the node 705.

In step 2007, the manager control unit 115 responds to the requesting node control unit 120, which issued the access request, by indicating that the open process has been unsuccessful, and then proceeds to an end state 2009.

In step 2008, the manager control unit 115 responds to the requesting node control unit 120, which issued the access request, by indicating that the open process has been successful, and then proceeds to the end state 2009.

Figure 22:
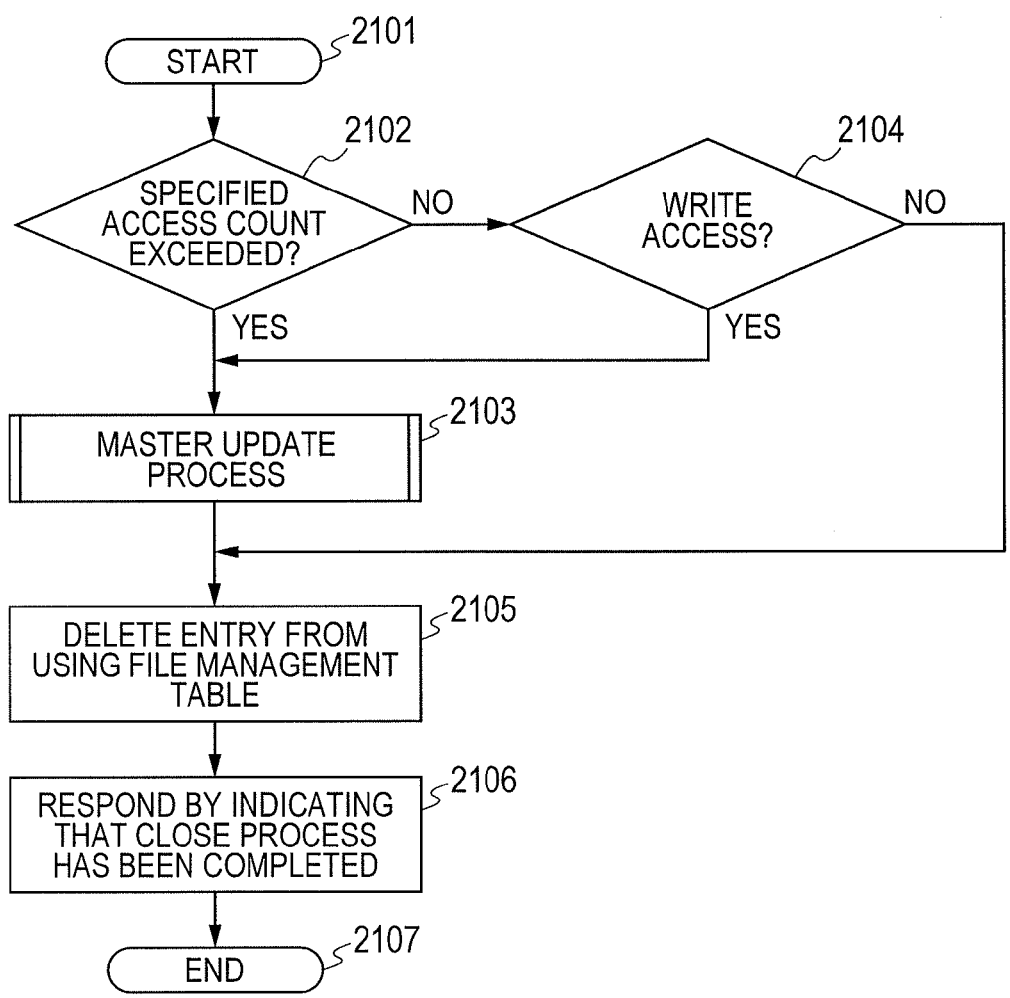
FIG. 22 is a flowchart illustrating a close process performed by the manager apparatus according to the first embodiment of the present invention.

FIG. 22 is a flowchart illustrating the close process (step 1917 shown in FIG. 20) that is performed by the manager control unit 115. First of all, the manager control unit 115 proceeds from a start state 2101 to step 2102. In step 2102, the manager control unit 115 reads the access management table 119 for a target file to judge whether a specified access count is exceeded. If the result of judgment is true, the manager control unit 115 proceeds to step 2103. If the result is false, the manager control unit 115 proceeds to step 2104. The method of defining the specified access count used in step 2102 is not described here because it is the same as the method used in step 1610, which is shown in FIG. 17. The judgment method used in step 2102 may alternatively be based on another standard as described in connection with step 1610.

In step 2104, the manager control unit 115 judges whether the access request is a write access request. If the result of judgment is true, the manager control unit 115 proceeds to step 2103. If the result is false, the manager control unit 115 proceeds to step 2105. When the manager control unit 115 proceeds from step 2104 to step 2103, step 2003 is performed as indicated in FIG. 21. In step 2103, the manager control unit 115 performs the master update process described with reference to FIG. 18, and then proceeds to step 2105.

In step 2105, the manager control unit 115 deletes a target entry concerning the target file from the using file management table 118, and then proceeds to step 2106.

In step 2106, the manager control unit 115 responds to the requesting node control unit 120, which issued the access request, by indicating that the close process has been completed, and then proceeds to an end state 2107. The target entry in the using file management table 118, which is handled in step 2105, is an entry whose value in the field of the ID 703 of the using file management table 118 agrees with the FID communicated at the time of data access request.

By performing the above processing steps, the manager control unit 115 responds to a request from the node control unit 120 and changes the state of the computer system. It should be noted that all processing steps indicated in FIGS. 17 to 22 are performed by the manager control unit 115.

Advantages of First Embodiment

According to the first embodiment described above, the manager control unit 115 switches between the read-preferred mode 201 and the write-preferred mode 202 in accordance with the access pattern of each file in the computer system including the manager apparatus 101, the node apparatus 102, and the node apparatus 103, which are interconnected through the WAN 104. Therefore, when the node apparatuses 102, 103 access a file stored in the manager apparatus 101, the handling of a copy of the file that is stored in the cache area 124 by the node apparatuses 102, 103 is changed to decrease the amount of traffic through the WAN 104. This results in an increase in the speed of file access.

Further, the decrease in the amount of traffic through the WAN 104 makes it possible to use the WAN 104 with high efficiency. Particularly when the node apparatus 102 or the node apparatus 103 attempts to gain read access to a file in the read-preferred mode 201, the node apparatus 102 or the node apparatus 103 does not have to access, for instance, the manager apparatus 101 through the WAN 104 for the purpose of using a copy of the file that is stored in the cache area 124. Therefore, the file can be accessed at the same high speed as when the local storage apparatus is accessed.

Second Embodiment

A second embodiment of the present invention will now be described. The second embodiment is a computer system that is configured so that a client connected to a node apparatus according to the first embodiment through a local area network (LAN) frequently accesses a file in a manager apparatus. Mainly the differences from the first embodiment will be described below. The same features and advantages as those of the first embodiment will not be redundantly described.

Figure 23:
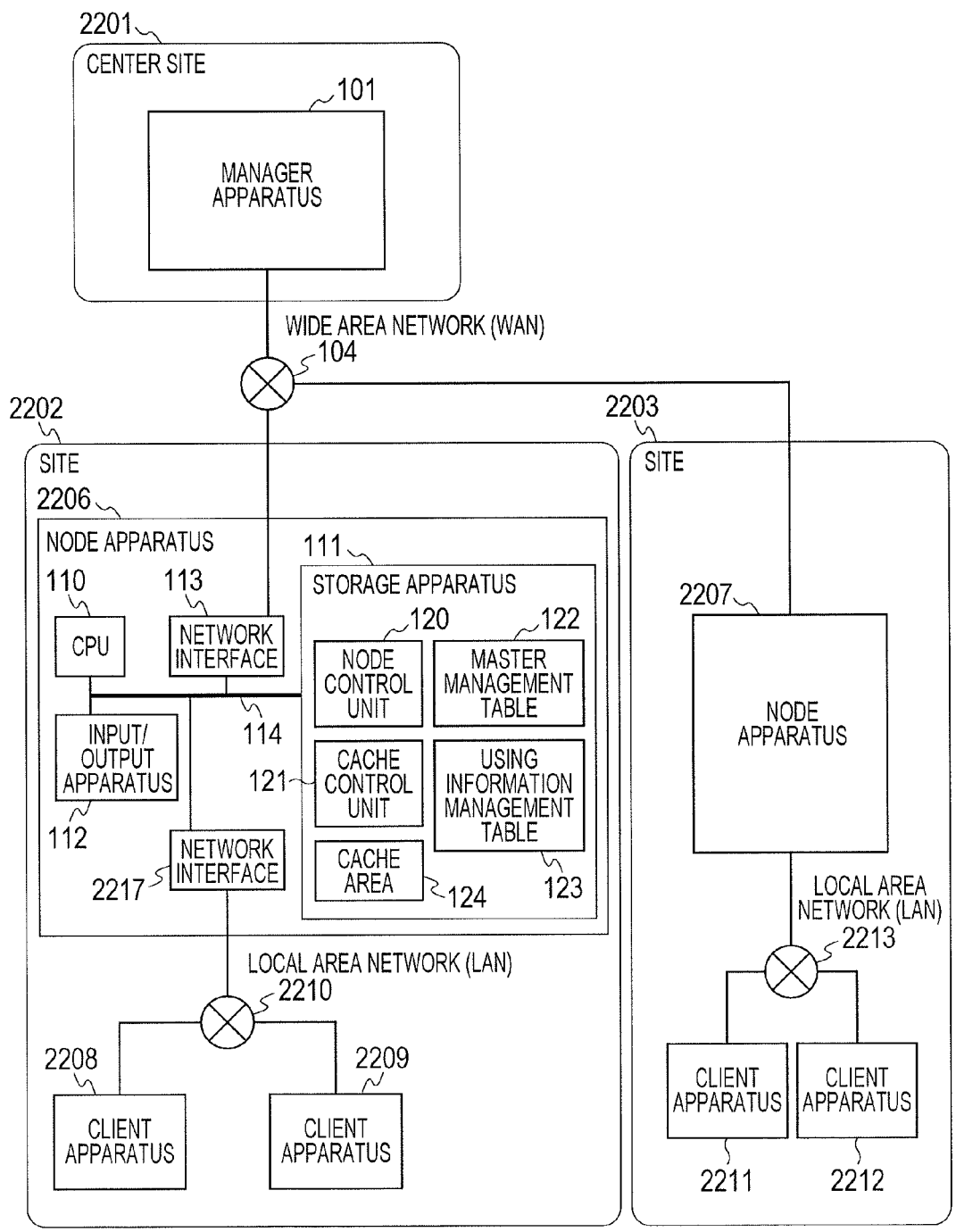
FIG. 23 is a block diagram illustrating an example configuration of the computer system according to a second embodiment of the present invention.

FIG. 23 illustrates an example configuration of the computer system according to the second embodiment of the present invention. In the second embodiment, the manager apparatus 101 at a center site 2201, a node apparatus 2206 at a site 2202, and a node apparatus 2207 at a site 2203 are interconnected through the WAN 104.

At the site 2202, the node apparatus 2206, a client apparatus 2208, and a client apparatus 2209 are interconnected through a local area network (LAN) 2210. At the site 2203, the node apparatus 2207, a client apparatus 2211, and a client apparatus 2212 are interconnected through a local area network (LAN) 2213.

It is assumed that the computer system shown in FIG. 23 represents an information system used, for instance, in an enterprise. The client apparatuses at the sites 2202, 2203 access files collected at the center site 2201. The computer system according to the second embodiment differs from the computer system according to the first embodiment, which is shown in FIG. 1, in that the client apparatuses 2208, 2209 are connected through the local area network (LAN) 2210. This difference will be described below. The manager apparatus 101 at the center site 2201 will not be redundantly described because it is the same as the manager apparatus 101 according to the first embodiment.

The local area network (LAN) 2210 provides communication between apparatuses installed at the site. A LAN (local area network) or other similar network is used as the local area network (LAN) 2210. Obviously, the present invention is not limited to the use of a LAN. Any other means of communication may be used, as is the case with the WAN 104 for the first embodiment.

The client apparatus 2208 at the site 2202 is a computer, such as a PC (personal computer), and used to access a file in the node apparatus 2206 through the local area network (LAN) 2210 or a file in the center site 2201 through the WAN 104. The configuration of the client apparatus 2208 is not described here because it can be achieved by using a publicly known or well-known technology. The client apparatus 2209 has the same configuration as the client apparatus 2208. One or more units of the client apparatus 2208 may be used.

The node apparatus 2206 is obtained by adding a network interface 2217 to the node apparatus 102 shown in FIG. 1, which depicts the first embodiment. The other components of the node apparatus 2206 are the same as the components of the node apparatus 102.

The network interface 2217 connected to the local area network (LAN) 2210 has the same configuration as the network interface 113, and is used to communicate with the client apparatuses 2208, 2209 through the local area network (LAN) 2210.

In the configuration shown in FIG. 23, the local area network (LAN) 2210 and the WAN 104 use different network interfaces, namely, the network interface 2217 and the network interface 113, respectively. Alternatively, however, the configuration of the node apparatus 2206 may be simplified by using only one network interface. If such an alternative scheme is employed, the node apparatus 2206 has the same configuration as the node apparatus 102 according to the first embodiment.

When accessing a file stored in the manager apparatus 101, the client apparatus 2208 gains access through the node apparatus 2206. As described with reference to FIG. 17, which depicts the first embodiment, the node apparatus 2206 receives a file access request, accesses the cache area 124 of the node apparatus 2206 or, if necessary, accesses the manager apparatus 101, and makes a response. The operations of the node apparatus 2206 and of the manager apparatus 102 are not described here because they are the same as those described in connection with the first embodiment.

The node apparatus 2207, the client apparatus 2211, the client apparatus 2212, and the local area network (LAN) 2213 at the site 2203 have the same configurations as the counterparts at the site 2202.

In the second embodiment, a read request or a write request for the node apparatuses 2206, 2207 is handled in such a manner that the node apparatuses 2206, 2207 receive a read request or a write request from the client apparatuses 2208, 2209, 2211, 2212 in place of the input/output apparatus 112 of the first embodiment.

Advantages of Second Embodiment

According to the second embodiment of the present invention, installing the node apparatus 2206 at the site 2202 having one or more units of the client apparatus 2208 makes it possible to use the cache area 124, which is included in the node apparatus 2206, when an attempt is made to access a file stored in the manager apparatus 101 at the center site 2201, which is connected to the site 2202 through the WAN 104.

In marked contrast to the first embodiment, the cache area 124 common to one or more units of the client apparatus 2208 is available in the second embodiment. Therefore, the amount of traffic through the WAN 104 can be reduced to increase the speed of file access and improve the utilization efficiency of the WAN 104. Further, as no changes need to be applied to the client apparatus 2208, it is possible to reduce the computer system construction cost per unit of the client apparatus 2208.

In the second embodiment, the node apparatuses 2206, 2207 may function as a gateway apparatus such as a router or a switch.

As described above, the present invention can be applied to a computer system that stores data and metadata in a distributed manner.

What is claimed is:

1. A cache control method for use in a computer system including a first apparatus which has a processor and a storage and stores data and metadata giving information about the data in the storage, a second apparatus which has a processor and a cache and stores a copy of data and metadata in the first apparatus in the cache, and a network which connects the first apparatus to a plurality of units of the second apparatus, the cache control method comprising:
a first step of causing the second apparatus to copy data and metadata in the first apparatus to the cache;
a second step of causing the first apparatus to acquire transfer time, transfer size, and access delay time involved when the second apparatus accesses data in the storage, as first access information;
a third step of causing the first apparatus to acquire transfer time, transfer size, and access delay time involved when the units of the second apparatus access the cached data, as second access information; and
a fourth step of causing the first apparatus to select either a first judgment mode or a second judgment mode in accordance with the first access information and the second access information about individual data, the first judgment mode allowing the second apparatus to acquire the metadata in the first apparatus, store the acquired metadata in the cache, and judge in accordance with the stored metadata whether the data copied to the cache is available, the second judgment mode allowing the second apparatus to acquire the metadata in the first apparatus and judge in accordance with the acquired metadata whether the data copied to the cache is available;
wherein the fourth step includes
computing first access time, which is required for allowing the second apparatus to access data in the first apparatus in the first judgment mode, from the acquired first access information,
computing second access time, which is required for allowing the second apparatus to access data in the units of the second apparatus in the second judgment mode, from the acquired second access information, and
comparing the first access time and the second access time on individual data basis and selecting the first judgment mode for the data when the first access time is shorter than the second access time or selecting the second judgment mode for the data when the second access time is shorter than the first access time.

2. The cache control method according to claim 1, wherein the second apparatus receives, for data to be accessed, either the first judgment mode or the second judgment mode from the first apparatus, and accesses the data in the received first judgment mode or in the received second judgment mode.

3. The cache control method according to claim 1, wherein the second apparatus receives an operation request concerning the data, and accesses the data in the first judgment mode if the operation request is a read request or accesses the data in the second judgment mode if the operation request is a write request.

4. The cache control method according to claim 1, wherein the second apparatus receives an operation request concerning the data from a client apparatus connected through a network.

5. A node apparatus comprising:
a processor; and
a cache, wherein
the node apparatus accesses data stored in a manager apparatus connected through a network and metadata giving information about the data,
the node apparatus selects either a first judgment mode or a second judgment mode, the first judgment mode being used to acquire the metadata from the manager apparatus at the time of storing a copy of the data, store the acquired metadata in the cache, and judge in accordance with the cached metadata whether data in the cache can be used in place of the data in the manger apparatus, the second judgment mode being used to acquire the metadata from manager apparatus at the time of using a copy of the data and judge in accordance with the acquired metadata whether the cached data can be used in place of the data in the manager apparatus, when an operation request concerning the data is received, the node apparatus judges in either the selected first judgment mode or the selected second judgment mode whether data copied to the cache is available, when the data copied to the cache is available, the node apparatus responds to the operation request by using the cached data and wherein, when the data copied to the cache is not available, the node apparatus issues a data request to the manager apparatus and responds to the operation request by using data acquired from the manager apparatus, and the node apparatus receives an operation request concerning the data, and accesses the data in the first judgment mode if the operation request is a read request or accesses the data in the second judgment mode if the operation request is a write request.

6. The node apparatus according to claim 5, wherein the node apparatus receives either the first judgment mode or the second judgment mode from the manager apparatus in relation to the data designated by the operation request and accesses the data in either the received first judgment mode or the received second judgment mode.

7. The node apparatus according to claim 5, wherein the node apparatus receives an operation request concerning the data from a client apparatus connected through a network.

8. A manager apparatus comprising:
a processor; and
a storage, wherein
  the manager apparatus stores data and metadata giving information about the data in the storage and receives an operation request concerning the data and metadata from a plurality of node apparatuses connected through a network,
  when transmitting the data to each of the node apparatuses or when receiving data updating the data from each of the node apparatuses, the manager apparatus acquires a transfer time required for the transmission or the reception, a transfer size indicating the size of the transmitted data or the received data, and a round-trip time from the manager apparatus to the node apparatuses, as access information,
  the manager apparatus computes first access time, which is required for the node apparatuses to access the data in the storage, from the acquired access information, and computes second access time, which is required for the node apparatuses to access data thereof, from the acquired access information, and
  the manager apparatus compares the first access time and the second access time on individual data basis and selects the first judgment mode for the data when the first access time is shorter than the second access time, the first judgment mode being used to let the node apparatuses acquire metadata from the storage, store the acquired metadata in a cache, and judge in accordance with the stored metadata whether data copied to the cache is available, or selects the second judgment mode for the data when the second access time is shorter than the first access time, the second judgment mode being used to let the node apparatuses acquire metadata from the storage and judge in accordance with the acquired metadata whether data copied to the cache is available.

9. A computer system comprising:
a manager apparatus that has a processor and a storage and stores data and metadata giving information about the data in the storage;
a plurality of node apparatuses that each have a processor and a cache and store a copy of data and metadata in the manager apparatus in the cache; and
a network that connects the manager apparatus to the node apparatuses;
  wherein, when transmitting the data to each of the node apparatuses or when receiving data updating the data from each of the node apparatuses, the manager apparatus acquires a transfer time required for the transmission or the reception, a transfer size indicating the size of the transmitted data or the received data, and a round-trip time from the manager apparatus to the node apparatuses, as access information;
  wherein the manager apparatus computes first access time, which is required for the node apparatuses to access the data in the storage, from the acquired access information, and computes second access time, which is required for the node apparatuses to access data thereof, from the acquired access information; and
  wherein the manager apparatus compares the first access time and the second access time on individual data basis and selects a first judgment mode for the data when the first access time is shorter than the second access time, the first judgment mode being used to let the node apparatuses acquire metadata from the storage, store the acquired metadata in a cache, and judge in accordance with the stored metadata whether data copied to the cache is available, or selects a second judgment mode for the data when the second access time is shorter than the first access time, the second judgment mode being used to let the node apparatuses acquire metadata from the storage and judge in accordance with the acquired metadata whether data copied to the cache is available.

* * * * *